(12) United States Patent
Lee

(10) Patent No.: US 9,606,691 B2
(45) Date of Patent: Mar. 28, 2017

(54) VOLTAGE DIFFERENCE-BASED CAPACITIVE TOUCH DETECTION DEVICE, CAPACITIVE TOUCH DETECTION METHOD AND CAPACITIVE TOUCH SCREEN PANEL, AND DISPLAY DEVICE WITH BUILT-IN CAPACITIVE TOUCH SCREEN PANEL

(71) Applicant: G2TOUCH Co., LTD., Seongnam (KR)

(72) Inventor: Sung Ho Lee, Hwaseong-si (KR)

(73) Assignee: G2TOUCH CO., LTD., Seongnam (KR)

( * ) Notice: Subject to any disclaimer, the term of this patent is extended or adjusted under 35 U.S.C. 154(b) by 0 days.

(21) Appl. No.: 14/811,107

(22) Filed: Jul. 28, 2015

(65) Prior Publication Data

US 2015/0331540 A1 Nov. 19, 2015

Related U.S. Application Data

(63) Continuation of application No. 14/003,443, filed as application No. PCT/KR2012/001582 on Mar. 2, 2012.

(30) Foreign Application Priority Data

Mar. 7, 2011 (KR) .................. 10-2011-0019867

(51) Int. Cl.
*G06F 3/044* (2006.01)
*G06F 3/041* (2006.01)
(Continued)

(52) U.S. Cl.
CPC .............. *G06F 3/044* (2013.01); *G06F 3/017* (2013.01); *G06F 3/045* (2013.01); *G06F 3/0412* (2013.01);
(Continued)

(58) Field of Classification Search
CPC ........................................................ G06F 3/044
See application file for complete search history.

(56) References Cited

U.S. PATENT DOCUMENTS

2008/0192018 A1* 8/2008 Park et al. ..................... 345/173
2011/0316809 A1* 12/2011 Kim ...................... G06F 3/0412
345/174

* cited by examiner

*Primary Examiner* — Robin Mishler

(57) ABSTRACT

Provided is a new capacitive touch detection device, detection method, and touch screen panel for detecting a touch signal by detecting a voltage difference of a sensor pattern from a driving voltage applied by an auxiliary capacitor, and to a display device having a built-in capacitive touch screen. A capacitive touch detection device includes: a sensor pattern (10) forming a touch capacitance (Ct) in between a touch input device and the sensor pattern; an auxiliary capacitor (Caux) connected on one side to the sensor pattern (10) and having a driving voltage for touch detection applied to the other side thereof; a charging unit (12) for providing pre-charge signals to the touch capacitance (Ct) and the auxiliary capacitor (Caux); and a touch detection sensor (14) which is connected to the sensor pattern (10) and which detects a touch signal by detecting a voltage difference in the sensor pattern (10) when the touch capacitance (Ct) is added to the auxiliary capacitor (Caux) according to a touch of a touch input instrument. Effects of parasitic capacitance generated due to noise, coupling phenomena and other factors are minimized, to thus stably acquire touch signals.

19 Claims, 14 Drawing Sheets

(51) Int. Cl.
  *G06F 3/045* (2006.01)
  *G06F 3/01* (2006.01)
  *G09G 3/36* (2006.01)
(52) U.S. Cl.
  CPC .......... *G06F 3/0416* (2013.01); *G06F 3/0418* (2013.01); *G09G 3/36* (2013.01); *G06F 2203/04101* (2013.01); *G06F 2203/04105* (2013.01); *G06F 2203/04111* (2013.01)

VOLTAGE DIFFERENCE-BASED CAPACITIVE TOUCH DETECTION DEVICE, CAPACITIVE TOUCH DETECTION METHOD AND CAPACITIVE TOUCH SCREEN PANEL, AND DISPLAY DEVICE WITH BUILT-IN CAPACITIVE TOUCH SCREEN PANEL

CROSS REFERENCE TO RELATED APPLICATION

This application is a continuation of U.S. patent application Ser. No. 14/003,443 filed Sep. 5, 2013(now pending), which is a national entry of International Application No. PCT/KR2012/001582, filed Mar. 2, 2012, which claims priority to Korea Patent Appl. No. 10-2011-0019867 filed Mar. 7, 2011 in the Korean Intellectual Property Office, the entire contents of which are incorporated herein by reference.

TECHNICAL FIELD

The present invention relates to a device, method, and touch screen panel, for detecting a capacitive touch input of a bodily finger or a touch input instrument having conductive characteristics similar to the bodily finger, and a display device with a built-in capacitive touch screen panel, and more particularly, to a capacitive touch detection device, capacitive touch detection method, and capacitive touch screen panel, which acquires a touch signal by detecting a voltage difference in a touch detection sensor when a driving voltage is applied through an auxiliary capacitor connected to the touch detection sensor, and a display device with a built-in capacitive touch screen panel.

BACKGROUND ART

Usually, touch screen panels are input devices which are respectively attached onto display devices such as LCDs (Liquid Crystal Displays), PDPs (Plasma Display Panels), OLED (Organic Light Emitting Diode) displays, and AMOLED (Active Matrix Organic Light Emitting Diode) displays, to thus generate an input signal corresponding to a position where an object such as a finger or a touch pen is touched on the touch screen panel. The touch screen panels are widely used in various fields of mobile devices such as small-sized portable mobile phones, industrial terminal devices, and DIDs (Digital Information Devices).

Various types of conventional touch screen panels are disclosed, but resistive type touch screen panels having simple manufacturing processes and inexpensive manufacturing costs have been used most widely. The resistive type touch screen panels, however, have a low transmittance and undergo a pressure to be applied, respectively, to thereby cause an inconvenient use. The resistive type touch screen panels also have difficulties in recognizing multiple touches and gestures, and cause detection errors.

In contrast, capacitive touch screen panels may have a high transmittance, recognize soft touches, and detect multiple touches and gestures satisfactorily, to thus widen a market share gradually.

FIG. 1 shows an example of the structure of a conventional capacitive touch screen panel. Referring to FIG. 1, in the conventional capacitive touch screen panel, transparent conductive films are respectively formed on the top and bottom surfaces of a transparent substrate 2 made of plastic or glass. Metal electrodes 4 for applying a voltage are formed at each of four corners of the transparent substrate 2. The transparent conductive film is formed of transparent metal such as ITO (Indium Tin Oxide) or ATO (Antimony Tin Oxide). The metal electrodes 4 respectively formed at the four corners of the transparent conductive film are formed by printing low resistivity conductive metal such as silver (Ag). A resistor network is formed around the metal electrodes 4. The resistor network is formed in a linearization pattern in order to transmit a control signal equally on the entire surface of the transparent conductive film. A protective film is coated on top of the transparent conductive film including the metal electrodes 4.

In the case of the capacitive touch screen panel, when a high-frequency alternating-current (AC) voltage is applied to the metal electrodes 4, the high-frequency alternating-current (AC) voltage spreads to the whole surface of the transparent substrate 2. Here, if a finger 8 or a conductive touch input unit lightly touches the top surface of the transparent conductive film on the transparent substrate 2, a certain amount of electric current is absorbed into the human body and a change in the electric current is detected by a built-in electric current sensor of a controller 6, to thus calculate the amount of electric current at the four metal electrode 4, respectively, and to thereby recognize a touch point.

However, the capacitive touch screen panel shown in FIG. 1 detects the amount of micro-current, and requires an expensive detecting device, to thus raise the price of the capacitive touch screen panel, and make it difficult to detect multiple touches.

In recent years, in order to overcome such problems, the capacitive touch screen panel shown in FIG. 2 has been chiefly used. The touch screen panel of FIG. 2 includes a transverse linear sensor pattern 5a, a longitudinal linear sensor pattern 5b, and a touch drive IC (Integrated Circuit) 7 for analyzing a touch signal. The touch screen panel detects a magnitude of a capacitance that is formed between the linear sensor pattern 5 and the finger 8. Here, the touch screen panel scans the transverse linear sensor pattern 5a and the longitudinal linear sensor pattern 5b to thus detect a touch signal and to thereby recognize a plurality of touch points.

However, when the touch screen panel is mounted on a display device such as a liquid crystal display (LCD) and is used, it may be difficult to detect a signal due to noise. For example, the liquid crystal display (LCD) uses a common electrode and an alternating-current (AC) common voltage (Vcom) is applied the common electrode in some cases. The common voltage Vcom of the common electrode acts as noise when detecting touch points.

FIG. 3 shows an example in which a conventional capacitive touch screen panel is installed on a liquid crystal display (LCD). A display device 200 such as the liquid crystal display (LCD) has a structure that liquid crystal is sealed and filled between a lower-side thin film transistor (TFT) substrate 205 and an upper-side color filter 215 to thereby form a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides back light units (BLUs) are provided.

As shown, a touch screen panel is provided on top of the display device 200. The touch screen panel has a structure that the linear sensor pattern 5 is put on the upper surface of the substrate 1. A protection panel 3 for protecting the linear sensor pattern 5 is attached on top of the substrate 1. The touch screen panel is bonded to the outer portion of the display device 200 through the medium of an adhesive member 9 such as a double adhesive tape (DAT), and an air gap 9a is formed between the display device 200 and the touch screen panel.

In this configuration, if a touch occurs as shown in FIG. 3, a capacitance Ct is formed between the finger 8 and the linear sensor pattern 5. Meanwhile, as shown, a capacitance Cvcom is formed between the linear sensor pattern 5 and a common electrode 220 formed on the lower surface of the color filter 215 of the display device 200, and an unknown parasitic capacitance Cp due to capacitive couplings between patterns or manufacturing process factors also functions at the linear sensor pattern 5. Thus, the same circuit as an equivalent circuit of FIG. 4 is configured.

Here, the conventional touch screen panel recognizes a touch by detecting an amount of change in the capacitance Ct, where the background components such as the capacitances Cvcom and Cp act as noise at the time of detecting the capacitance Ct. For example, small- and medium-sized LCDs for mobile devices employ a line inversion method in which the common voltage Vcom of the common electrode 220 alternates by one or a plurality of gate lines as shown in FIG. 5, in order to reduce current consumption, and thus the alternating electric field acts as considerable noise at the time of detection of touches.

Typically, in order to remove the noise, the air gap 9a is placed between the touch screen panel and the display device 200 as shown in FIG. 3. In addition, although it is not shown, an ITO layer is coated on the lower surface of the substrate 1 of the touch-screen panel, to thereby form a shield layer. In addition, the shield layer is grounded with the ground signal.

However, in the case of the conventional art, products become thick and the quality of the products deteriorates due to the air gap 9a. In addition, the conventional art requires a separate shield layer and a manufacturing process of configuring the shield layer, thereby causing a rise of a manufacturing cost. In particular, in the case of forming a built-in touch screen panel in a liquid crystal display (LCD), it is very difficult to form the air gap 9a or the shield layer, and thus it is also very difficult to form the built-in touch screen panel in a display device such as the liquid crystal display (LCD).

DISCLOSURE

Technical Problem

In order to solve the above-mentioned problems of a conventional capacitive touch screen panel, it is an object of the present invention to provide a capacitive touch detection device, capacitive touch detection method, and capacitive touch screen panel, which acquires a touch signal by detecting a voltage difference that causes a difference between voltages in magnitude that are detected from a touch detection sensor according to a magnitude of a touch capacitance, when an auxiliary capacitor is connected to the touch detection sensor, a driving voltage is applied through the auxiliary capacitor, and the touch capacitance is additionally formed between a touch input instrument and a sensor pattern, and a display device with a built-in capacitive touch screen panel, to thereby minimize an influence due to noise of a common electrode of the display device, and an influence due to a parasitic capacitance, to thereby stably acquire the touch signal, and to thereby simultaneously facilitate to incorporate a built-in touch screen panel in the display device such as a liquid crystal display (LCD).

Technical Solution

To attain the above object of the present invention, according to an aspect of the present invention, there is provided a capacitive touch detection device for detecting occurrence of a touch capacitance (Ct) by an approach of a bodily finger (25) or a touch input instrument such as a conductor similar to the bodily finger, the capacitive touch detection device comprising: at least one sensor pattern (10) that forms the touch capacitance (Ct) between the touch input instrument and the sensor pattern; an auxiliary capacitor (Caux) whose one side is connected to the sensor pattern (10) and to the other side of which a driving voltage for detection of a touch input is applied; a charging unit (12) that supplies a pre-charge signal to the sensor pattern (10) and the auxiliary capacitor (Caux), to thus accumulate charges in the touch capacitance (Ct) and the auxiliary capacitor (Caux); and a touch detection sensor (14) that is connected to the sensor pattern (10), and that detects a voltage difference that is a difference in the magnitude of a voltage generated in the sensor pattern (10) by a driving voltage applied to the auxiliary capacitor (Caux) when the touch capacitance (Ct) is added at the time of occurrence of a touch input, in comparison with the magnitude of a voltage generated by a driving voltage applied to the auxiliary capacitor (Caux) in the sensor pattern (10) at the time of non-occurrence of a touch input, to thereby detect a touch signal.

According to an embodiment of the present invention, the charging unit (12) is a three-terminal type switching device.

According to another embodiment of the present invention, the other side of the auxiliary capacitor (Caux) is connected to an ON/OFF control terminal of the charging unit (12), and the driving voltage that is applied to the other side of the auxiliary capacitor (Caux) is the same as an ON/OFF control voltage of the charging unit (12).

According to another embodiment of the present invention, the driving voltage that is applied to the other side of the auxiliary capacitor (Caux) is an alternating voltage that alternates at a predetermined frequency.

According to another embodiment of the present invention, the touch detection sensor (14) detects a voltage difference in the sensor pattern (10) at a rising time and/or a falling time of the driving voltage that is applied to the auxiliary capacitor (Caux).

According to another embodiment of the present invention, a common electrode capacitance (Cvcom) is formed between the sensor pattern (10) and a common electrode (220) of a display device (200), and the capacitive touch detection device further comprises a common voltage detector (43) that detects a common voltage level of the common electrode (220).

According to another embodiment of the present invention, the common voltage detector (43) detects a voltage difference in the sensor pattern (10) due to the common electrode capacitance (Cvcom) to thus detect a rising time and a falling time of the common voltage level.

According to another embodiment of the present invention, a common electrode capacitance (Cvcom) is formed between the sensor pattern (10) and a common electrode (220) of a display device (200), and the capacitive touch detection device further comprises a common voltage information receiver (45) that receives common voltage information of the common electrode (220) from the display device (200).

According to another embodiment of the present invention, the touch detection sensor (14) detects the touch signal at a portion other than a rising edge and a falling edge of the common voltage level.

According to another embodiment of the present invention, the touch detection sensor (14) detects a voltage difference that is a difference in the magnitude of a voltage generated in the sensor pattern (10) when the touch capacitance (Ct) is added at the time of occurrence of a touch input, in comparison with the magnitude of a voltage generated by the auxiliary capacitor (Caux) in the sensor pattern (10) at the time of non-occurrence of a touch input, to thereby detect a touch signal.

According to another embodiment of the present invention, a voltage generated in the sensor pattern (10) by a driving voltage applied to the auxiliary capacitor (Caux) at the time of non-occurrence of a touch input is determined by following Equation 1, a voltage generated in the sensor pattern (10) by a driving voltage applied to the auxiliary capacitor (Caux) at the time of addition of the touch capacitance (Ct) is determined by following Equation 2, and the voltage difference occurs due to a difference between the voltages of the following Equations 1 and 2, $$\Delta Vsensor = \pm (Vh - Vl)\frac{Caux}{Caux + Cvcom + Cp} \qquad 1$$

$$\Delta Vsensor = \pm (Vh - Vl)\frac{Caux}{Caux + Cvcom + Cp + Ct}, \qquad 2$$

in which ΔVsensor is a voltage difference in the sensor pattern, Vh is a high level voltage applied to the auxiliary capacitor, Vl is a low level voltage applied to the auxiliary capacitor, Caux is an auxiliary capacitor capacitance, Cvcom, is a common electrode capacitance, Cp is a parasitic capacitance, and Ct is a touch capacitance.

According to another embodiment of the present invention, an input end of the touch detection sensor (14) is in a high-impedance state of at least 1 Mohm at the time of detection of the touch signal.

According to another embodiment of the present invention, the touch detection sensor (14) detects a touch sharing ratio of the touch input instrument with respect to the sensor pattern (10) in response to the magnitude of the voltage difference.

According to another embodiment of the present invention, the touch detection sensor (14) is an analog-to-digital converter (ADC).

According to another embodiment of the present invention, the touch detection sensor (14) comprises an amplifier (18) that amplifies the signal from the sensor pattern (10).

According to another embodiment of the present invention, the amplifier (18) is a differential amplifier (18a) that differentially amplifies the signal from the sensor pattern (10).

According to another embodiment of the present invention, the capacitive touch detection device further comprises a memory unit (28) that stores the output of the amplifier (18) for each sensor pattern (10) at the time of non-occurrence of a touch unit, wherein it is judged whether or not a touch input exists for each sensor pattern (10), with reference to the memory unit (28).

According to another aspect of the present invention, there is also provided a capacitive touch detection method for detecting occurrence of a touch capacitance (Ct) by an approach of a bodily finger (25) or a touch input instrument such as a conductor similar to the bodily finger, the capacitive touch detection method comprising the steps of: (a) supplying a pre-charge signal to at least one sensor pattern (10) that forms the touch capacitance (Ct) between the touch input instrument and the sensor pattern (10) and an auxiliary capacitor (Caux) whose one side is connected to the sensor pattern (10) and to the other side of which a driving voltage for detection of a touch input is applied; (b) detecting a voltage difference in the sensor pattern (10); and (c) detecting occurrence of a voltage difference in the sensor pattern (10), to thereby detect a touch signal.

According to another embodiment of the present invention, the charging unit (12) is a three-terminal type switching device.

According to another embodiment of the present invention, the other side of the auxiliary capacitor (Caux) is connected to an ON/OFF control terminal of the charging unit (12), and the driving voltage that is applied to the other side of the auxiliary capacitor (Caux) is the same as an ON/OFF control voltage of the charging unit (12).

According to another embodiment of the present invention, the driving voltage that is applied to the other side of the auxiliary capacitor (Caux) is an alternating voltage that alternates at a predetermined frequency.

According to another embodiment of the present invention, at step (b), a voltage difference is detected in the sensor pattern 10 at a rising time and/or a falling time of the driving voltage that is applied to the auxiliary capacitor (Caux).

According to another embodiment of the present invention, a common electrode capacitance (Cvcom) is formed between the sensor pattern (10) and a common electrode (220) of a display device (200), and the capacitive touch detection method further comprises the step of detecting a common voltage level of the common electrode (220).

According to another embodiment of the present invention, at the step of detecting a common voltage level, a voltage difference is detected in the sensor pattern 10 due to the common electrode capacitance (Cvcom) to thus detect a rising time and a falling time of the common voltage level.

According to another embodiment of the present invention, a common electrode capacitance (Cvcom) is formed between the sensor pattern (10) and a common electrode (220) of a display device (200), and the capacitive touch detection method further comprises the step of receiving common voltage information of the common electrode (220) from the display device (200).

According to another embodiment of the present invention, at step (c), the touch signal is detected at a portion other than a rising edge and a falling edge of the common voltage level.

According to another embodiment of the present invention, at step (c), a voltage difference that is a difference in the magnitude of a voltage generated in the sensor pattern (10) when the touch capacitance (Ct) is added at the time of occurrence of a touch input, is detected in comparison with the magnitude of a voltage generated by the auxiliary capacitor (Caux) in the sensor pattern (10) at the time of non-occurrence of a touch input, to thereby detect a touch signal.

According to another embodiment of the present invention, a voltage generated in the sensor pattern (10) by a driving voltage applied to the auxiliary capacitor (Caux) at the time of non-occurrence of a touch input is determined by following Equation 1, a voltage generated in the sensor pattern (10) by a driving voltage applied to the auxiliary capacitor (Caux) at the time of addition of the touch capacitance (Ct) is determined by following Equation 2, and the voltage difference occurs due to a difference between the voltages of the following Equations 1 and 2, $$\Delta Vsensor = \pm(Vh-Vl)\frac{Caux}{Caux+Cvcom+Cp} \qquad 1$$

$$\Delta Vsensor = \pm(Vh-Vl)\frac{Caux}{Caux+Cvcom+Cp+Ct}, \qquad 2$$

in which ΔVsensor is a voltage difference in the sensor pattern, Vh is a high level voltage applied to the auxiliary capacitor, Vl is a low level voltage applied to the auxiliary capacitor, Caux is an auxiliary capacitor capacitance, Cvcom is a common electrode capacitance, Cp is a parasitic capacitance, and Ct is a touch capacitance.

According to another embodiment of the present invention, at step (c), an input end of a portion of detecting the touch signal is in a high-impedance state of at least 1 Mohm at the time of detection of the touch signal.

According to another embodiment of the present invention, at step (c), a touch sharing ratio of the touch input instrument with respect to the sensor pattern (10) is detected in response to the magnitude of the voltage difference.

According to another embodiment of the present invention, at step (c), it is detected whether or not a voltage difference is detected in the sensor pattern (10) by using an analog-to-digital converter (ADC).

According to another embodiment of the present invention, at step (c), it is detected whether or not a voltage difference is detected in the sensor pattern (10) by using an amplifier (18) that amplifies the signal from the sensor pattern (10).

According to another embodiment of the present invention, the amplifier (18) is a differential amplifier (18a) that differentially amplifies the signal from the sensor pattern (10).

According to another embodiment of the present invention, the capacitive touch detection method further comprises the step of storing the output of the amplifier (18) in a memory unit (28) for each sensor pattern (10) at the time of non-occurrence of a touch unit, wherein at step (c), it is detected whether or not a voltage difference is detected in the sensor pattern (10), for each sensor pattern (10) with reference to the memory unit (28).

According to another aspect of the present invention, there is also provided a capacitive touch screen panel for detecting occurrence of a touch capacitance (Ct) by an approach of a bodily finger (25) or a touch input instrument such as a conductor similar to the bodily finger, the capacitive touch screen panel comprising: a substrate (50); at least one sensor pattern (10) that is formed on top of the substrate (50), and forms the touch capacitance (Ct) between the touch input instrument and the sensor pattern; an auxiliary capacitor (Caux) whose one side is connected to the sensor pattern (10) and to the other side of which a driving voltage for detection of a touch input is applied; a charging unit (12) that supplies a pre-charge signal to the sensor pattern (10) and the auxiliary capacitor (Caux), to thus accumulate charges in the touch capacitance (Ct) and the auxiliary capacitor (Caux); a touch detection sensor (14) that is connected to the sensor pattern (10), and that detects a voltage difference that is a difference in the magnitude of a voltage generated in the sensor pattern (10) by a driving voltage applied to the auxiliary capacitor (Caux) when the touch capacitance (Ct) is added at the time of occurrence of a touch input, in comparison with the magnitude of a voltage generated by a driving voltage applied to the auxiliary capacitor (Caux) in the sensor pattern (10) at the time of non-occurrence of a touch input, to thereby detect a touch signal; and a drive integrated circuit (IC) (30) that controls the charging unit (12) to supply a pre-charge signal to the touch capacitance (Ct) and computes touch coordinates from the output of the touch detection sensor (14).

According to another embodiment of the present invention, the charging unit (12) is a three-terminal type switching device.

According to another embodiment of the present invention, the other side of the auxiliary capacitor (Caux) is connected to an ON/OFF control terminal of the charging unit (12), and the driving voltage that is applied to the other side of the auxiliary capacitor (Caux) is the same as an ON/OFF control voltage of the charging unit (12).

According to another embodiment of the present invention, the driving voltage that is applied to the other side of the auxiliary capacitor (Caux) is an alternating voltage that alternates at a predetermined frequency.

According to another embodiment of the present invention, the touch detection sensor (14) detects a voltage difference in the sensor pattern (10) at a rising time and/or a falling time of the driving voltage that is applied to the auxiliary capacitor (Caux).

According to another embodiment of the present invention, a common electrode capacitance (Cvcom) is formed between the sensor pattern (10) and a common electrode (220) of a display device (200), and the capacitive touch screen panel further comprises a common voltage detector (43) that detects a common voltage level of the common electrode (220).

According to another embodiment of the present invention, the common voltage detector (43) detects a voltage difference in the sensor pattern 10 due to the common electrode capacitance (Cvcom) to thus detect a rising time and a falling time of the common voltage level.

According to another embodiment of the present invention, a common electrode capacitance (Cvcom) is formed between the sensor pattern (10) and a common electrode (220) of a display device (200), and the capacitive touch screen panel further comprises a common voltage information receiver (45) that receives common voltage information of the common electrode (220) from the display device (200).

According to another embodiment of the present invention, the touch detection sensor (14) detects the touch signal at a portion other than a rising edge and a falling edge of the common voltage level.

According to another embodiment of the present invention, the touch detection sensor (14) detects a voltage difference that is a difference in the magnitude of a voltage generated in the sensor pattern (10) when the touch capacitance (Ct) is added at the time of occurrence of a touch input, in comparison with the magnitude of a voltage generated by the auxiliary capacitor (Caux) in the sensor pattern (10) at the time of non-occurrence of a touch input, to thereby detect a touch signal.

According to another embodiment of the present invention, a voltage generated in the sensor pattern (10) by a driving voltage applied to the auxiliary capacitor (Caux) at the time of non-occurrence of a touch input is determined by following Equation 1, a voltage generated in the sensor pattern (10) by a driving voltage applied to the auxiliary capacitor (Caux) at the time of addition of the touch capacitance (Ct) is determined by following Equation 2, and the voltage difference occurs due to a difference between the voltages of the following Equations 1 and 2, $$\Delta Vsensor = \pm(Vh-Vl)\frac{Caux}{Caux+Cvcom+Cp} \qquad 1$$

$$\Delta Vsensor = \pm(Vh-Vl)\frac{Caux}{Caux+Cvcom+Cp+Ct}, \qquad 2$$

in which ΔVsensor is a voltage difference in the sensor pattern, Vh is a high level voltage applied to the auxiliary capacitor, Vl is a low level voltage applied to the auxiliary capacitor, Caux is an auxiliary capacitor capacitance, Cvcom is a common electrode capacitance, Cp is a parasitic capacitance, and Ct is a touch capacitance.

According to another embodiment of the present invention, an input end of the touch detection sensor (14) is in a high-impedance state of at least 1 Mohm at the time of detection of the touch signal.

According to another embodiment of the present invention, the touch detection sensor (14) detects a touch sharing ratio of the touch input instrument with respect to the sensor pattern (10) in response to the magnitude of the voltage difference.

According to another embodiment of the present invention, the touch detection sensor (14) is an analog-to-digital converter (ADC).

According to another embodiment of the present invention, the touch detection sensor (14) comprises an amplifier (18) that amplifies the signal from the sensor pattern (10).

According to another embodiment of the present invention, the amplifier (18) is a differential amplifier (18a) that differentially amplifies the signal from the sensor pattern (10).

According to another embodiment of the present invention, the capacitive touch screen panel further comprises a memory unit (28) that stores the output of the amplifier (18) for each sensor pattern (10) at the time of non-occurrence of a touch unit, wherein it is judged whether or not a touch input exists for each sensor pattern (10), with reference to the memory unit (28).

According to another embodiment of the present invention, a plurality of the sensor patterns (10) are arranged in a dot matrix form, in an active region (90) of the substrate (50), and the charging unit (12) and the touch detection sensor (14) are provided for each sensor pattern (10).

According to another embodiment of the present invention, a plurality of the sensor patterns (10) are arranged in a dot matrix form, in an active region (90) of the substrate (50), and the charging unit (12) and the touch detection sensor (14) are assigned for the plurality of the sensor patterns (10) and used by multiplexing the plurality of the sensor patterns (10).

According to another embodiment of the present invention, the charging unit (12) and the touch detection sensor (14) are provided in a non-visible region (92) of the substrate (50).

According to another embodiment of the present invention, the charging unit (12) and the touch detection sensor (14) are integrated in the drive IC (30).

According to another embodiment of the present invention, a plurality of the sensor patterns (10) are arranged in a linear form in an active region (90) of the substrate (50), and cross sections (42) at which at least two or more linear sensor patterns (10a, 10b) intersect are formed.

According to another embodiment of the present invention, the linear sensor patterns (10a, 10b) comprise opposite areas (41a) that form touch capacitance (Ct) between each of the sensor patterns (10a, 10b) and the touch input instrument, and connectors (41b) that connect the opposite areas (41a).

According to another embodiment of the present invention, the charging unit (12) and the touch detection sensor (14) that are assigned to each of the linear sensor patterns (10a, 10b) are provided in a non-visible region (92) of the substrate (50).

According to another embodiment of the present invention, the charging unit (12) and the touch detection sensor (14) that are assigned to each of the linear sensor patterns (10a, 10b) are integrated in the drive IC (30).

According to another embodiment of the present invention, a sensor signal line (22) withdrawn from the sensor pattern (10) is wired by a transparent signal line in at least an active region (90) of the substrate (50).

According to another embodiment of the present invention, the sensor signal line (22) is wired into a metal signal line (22b) that is connected with the transparent signal line (22a) by the medium of a connector (59) in the non-visible region (92) of the substrate (50).

According to another embodiment of the present invention, the sensor signal lines (22) are placed between the sensor patterns (10) in the active region (90) of the substrate (50).

According to another embodiment of the present invention, the line width of the sensor signal line (22) varies depending on the location of the sensor pattern (10) on the substrate (50).

According to another embodiment of the present invention, the drive IC (30) is mounted in a COG (Chip On Glass) or COF (Chip On Film) form at one side of the substrate (50).

According to another embodiment of the present invention, a plurality of drive ICs (30) are mounted at one side of the substrate (50), in which one is a master drive IC (30a) that transfers touch signals to the outside, and the others are slave drive ICs (30b) that communicate with the master drive IC (30a).

According to another embodiment of the present invention, the master drive IC (30a) and the slave drive ICs (30b) refer to mutual touch detection information on the boundary surface of regions that govern the master drive IC (30a) and the slave drive ICs (30b).

According to another embodiment of the present invention, a protection panel (52) is further attached on top of the substrate (50).

According to another embodiment of the present invention, the substrate (50) is built in a display device (200), or is any one of substrates constituting the display device (200).

According to another aspect of the present invention, there is also provided a display device with a built-in capacitive touch screen panel wherein the built-in capacitive touch screen panel is a capacitive touch screen panel according the ones mentioned above, and any one substrate of a basic structure has a structure of the substrate (50).

According to another embodiment of the present invention, the display device (200) is a liquid crystal display device, and the substrate (50) is a color filter (215) of the display device.

According to another embodiment of the present invention, the drive IC (60) for displaying and the drive IC (30) for the touch screen panel are integrated into a single IC.

According to another embodiment of the present invention, the sensor pattern (10) is located on the boundary surface that discriminates pixels.

According to another embodiment of the present invention, the sensor pattern (10) is formed to avoid invading a pixel area.

According to another embodiment of the present invention, the sensor signal line (22) withdrawn from the sensor pattern (10) is placed along the boundary surface that discriminates pixels.

According to another embodiment of the present invention, the sensor pattern (10) and the sensor signal line (22) are formed by a same mask.

According to another embodiment of the present invention, the sensor pattern (10) and the sensor signal line (22) are formed of metal.

According to another embodiment of the present invention, the sensor pattern (10) is formed between the color resin and the glass of a color filter (215).

Advantageous Effects

In the case that a common electrode of a display device has a common voltage level alternating at a predetermined frequency, the common electrode of the display device has a direct-current (DC) level, or the common electrode of the display device alternates at an unqualified unspecified frequency, a voltage difference-based capacitive touch detection device, capacitive touch detection method, and capacitive touch screen panel, and a display device with a built-in capacitive touch screen panel, according to the present invention, detects changes in the state of a common voltage, avoids a point in time of the changes of the state, applies a driving voltage through an auxiliary capacitor connected to a touch detection sensor, and detects occurrence of a voltage difference in the touch detection sensor by a touch capacitance added by a touch input, to thereby acquire a touch signal. As a result, influences due to a parasitic capacitance generated by noise, a coupling phenomenon, or other factors are minimized, and erroneous recognition of signals does not occur. In addition, the present invention detects a touch input at a relatively high voltage level, to thus easily capture a signal even with a small cross-sectional area of a touch input instrument, and to thereby make it possible to perform a stylus pen input. In addition, the present invention obtains a touch share ratio of a touch input instrument depending on the magnitude of a voltage difference, to thus increase touch resolution and enable fine handwriting and drawing. In addition, the present invention may configure an active region of a touch screen panel into a single-layer, to thus simplify a manufacturing process and provide an effect of obtaining an excellent yield.

DESCRIPTION OF DRAWINGS

The above and other objects and advantages of the invention will become more apparent by describing the preferred embodiments with reference to the accompanying drawings in which.

BEST MODE

Figure 1:
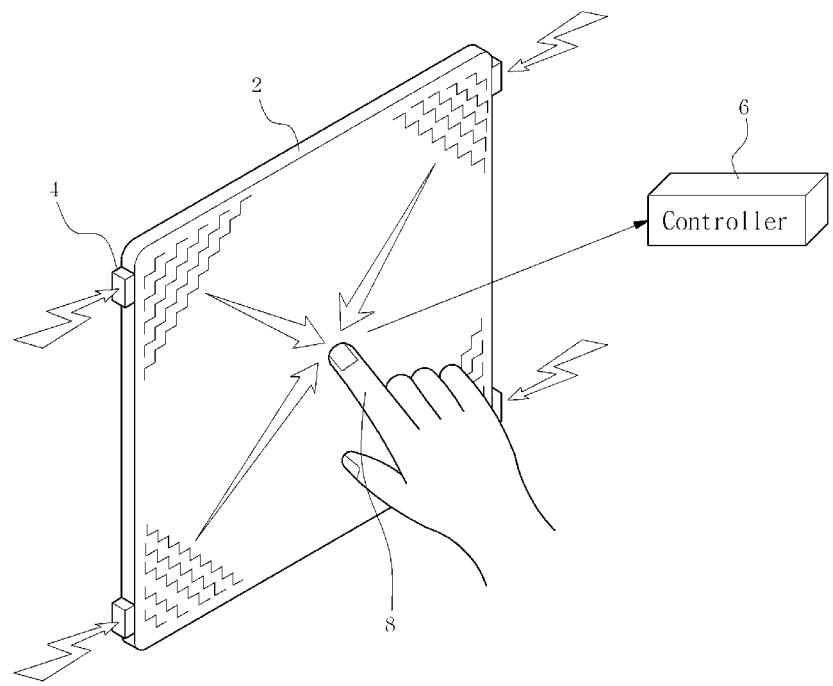
FIG. 1 is a perspective view showing an example of a conventional capacitive touch screen panel.

Hereinbelow, preferred embodiments of the present invention will be described in detail with reference to the accompanying drawings.

First, the present invention relates to a voltage difference-based capacitive touch detection device, capacitive touch detection method, and capacitive touch screen panel, and a display device with a built-in capacitive touch screen panel. A conventional capacitive touch detection device detects a change in capacitance due to contact of a finger and the like, but the capacitive touch detection device according to the present invention detects a voltage difference caused by a correlation of the magnitude of a touch capacitance due to an auxiliary capacitor and each of sensor patterns, when an alternating driving voltage is applied to the added auxiliary capacitor. A touch detecting system according to the present invention compares a voltage due to an auxiliary capacitor, a common electrode capacitance, and a parasitic capacitance at the time of non-occurrence of a touch input, with a voltage that is generated when a touch capacitance is added to the common electrode capacitance at the time of occurrence of a touch input, and thus detects a voltage difference that is a difference in magnitudes between the two voltages, to thus minimize influences caused by external noise or a parasitic capacitance, and to thereby acquire a touch signal more reliably.

The display devices referred to in the present invention, may be LCDs (Liquid Crystal Displays), PDPs (Plasma Display Panels), OLED (Organic Light Emitting Diode) displays, and AMOLED (Active Matrix Organic Light Emitting Diode) displays, or any other means of displaying images thereon. LCDs (Liquid Crystal Displays) of the above-listed display devices need a common voltage (Vcom) for operation of liquid crystals. As an example, small and medium-sized LCDs for mobile devices employ line inversion methods in which a common voltage of a common electrode alternates for one or a plurality of gate lines, to reduce the current consumption. As another example, large-sized LCDs are configured so that a common voltage of a common electrode has a constant DC level. As still another example, a certain display device is configured to form a shielding electrode that acts as being common for the entire panel to shut off the external electrostatic discharge (ESD), and to make the shielding electrode grounded into the ground signal. Otherwise, in any transverse electric field mode LCDs, a common electrode is located on the TFT substrate, and the common voltage that is detected from the upper surface of a color filter is configured to alternate at an unspecified frequency up and down based on the DC level.

In the present invention, in addition to the electrodes to which the above common voltage (Vcom) is applied, all the electrodes playing a common role in a display device are referred to as "common electrodes" and an alternating voltage or a DC voltage or a voltage alternating at an unspecified frequency is referred to as a "common voltage."

The present invention detects a non-contact touch input of a finger or a touch input instrument having electrical characteristics similar to the finger. Here, the term "non-contact touch input" means that a touch input instrument of a finger and the like performs a touch input at a state spaced by a predetermined distance apart from a sensor pattern by a substrate. The touch input instrument may contact an outer surface of the substrate. However, even in this case, the touch input instrument and the sensor pattern remain in a non-contact state. Therefore, a touch action of a finger on a sensor pattern may be expressed in the term "approach." Meanwhile, since a finger remains in a contact state for an outer surface of the substrate, a touch action of a finger on the substrate may be expressed in the term "contact." In this specification and claims, the terms "approach" and "contact" are commonly used as the same meanings as above.

The components such as "~ portion" are configurational elements that perform certain functions and mean software configurational elements or hardware configurational elements such as FPGA (Field-Programmable Gate Array) or ASIC (Application Specific Integrated Circuit). In addition, the software or hardware configurational elements can be included in larger components or can include smaller components. In addition, the software or hardware configurational elements may contain their own central processing units (CPUs) therein.

In the following drawings, thickness or areas have been enlarged to definitely show several layers and areas. Through the whole detailed description of the specification, like reference numerals are used for like elements. When it is mentioned that a portion such as a layer, a film, an area and a substrate is placed "on" or "on the upper surface" of another portion, this means that the portion is not only placed "justly on" the other portion but also the former is placed on a third portion between the former and the latter. In contrary, when it is mentioned that a certain portion is placed "justly on" another portion, this means that there are no other portions between them. In addition, the signal described herein, collectively refer to, unless otherwise stated, voltage or current.

Figure 6:
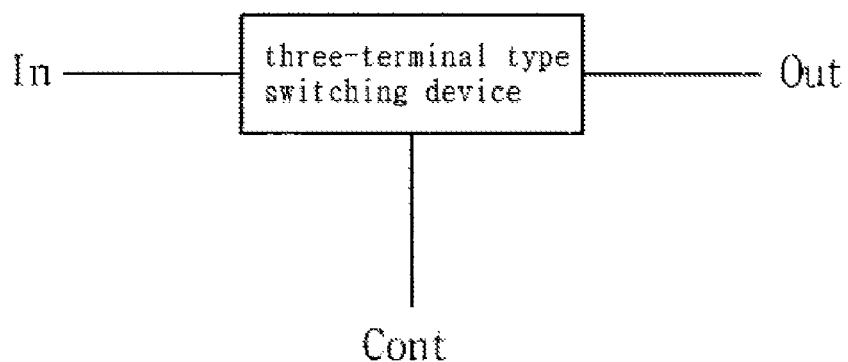
FIG. 6 is a diagram conceptually showing a conventional three-terminal type switching device.

FIG. 6 is a conceptual diagram showing a three-terminal type switching device that is used as an example of a charging unit in the present invention. Referring to FIG. 6, the three-terminal type switching device includes three terminals having an ON/OFF control terminal (indicated as "Cont" in FIG. 6), an input terminal (indicated as "In" in FIG. 6), and an output terminal (indicated as "Out" in FIG. 6). The ON/OFF control terminal is a control terminal for controlling the ON/OFF operations of the switching device. If a predetermined magnitude of voltage or current is applied to the ON/OFF control terminal, voltage or current that is applied to the input terminal is output in the form of voltage or current via the output terminal.

The three-terminal type switching device referred to as the charging unit in the present invention may be for example, a relay, a MOS (Metal Oxide Semiconductor) switch, a BJT (Bipolar Junction Transistor) switch, a FET (Field Effect Transistor) switch, a MOSFET (Metal Oxide Semiconductor Field Effect Transistor) switch, an IGBT (Insulated Gate Bipolar Transistor) switch, a TFT (Thin Film Transistor) switch, or an OP-AMP (OPerational AMPlifier) switch, and may be formed by a homogeneous or heterogeneous combination among these.

The relay may be used as a four-terminal type switching device, in addition to the three-terminal type switching device. All devices having an ON/OFF control terminal that turns on/off an input and output regardless of the number of input and output terminals and whose input and output are turned on/off by the ON/OFF control terminal, may be used as the charging unit.

Meanwhile, a CMOS (Complementary Metal Oxide Semiconductor) switch is formed by a mutual combination of PMOS (P-channel MOS) and NMOS (N-channel MOS) switches as an example of the three-terminal type switching device, in which input and output terminals are connected to each other, but the ON/OFF control terminal exists separately and is connected to an identical control signal, or is connected separately to individual control signals, to thus determine an ON/OFF state of the switch. The relay is a device that when a current is applied to a control terminal, a voltage or current applied to the input terminal is output without loss. The BJT switch is a device in which a certain amount of amplified current flows from a collector terminal thereof to an emitter terminal thereof when a current is applied to a base terminal thereof at a state where a current higher than a threshold voltage of the base terminal has been applied to the base terminal. In addition, the TFT switch is a switching device that is used in a pixel unit for display device such as a LCD or AMOLED, and includes a gate terminal that is a control terminal, a source terminal that is an input terminal, and a drain terminal that is an output terminal, in which the TFT switch is energized when a voltage higher than a threshold voltage higher than a voltage applied to the drain terminal is applied to the gate terminal, and thus a current depending on the magnitude of a voltage applied to the gate terminal flows from the input terminal to the output terminal.

Figure 7:
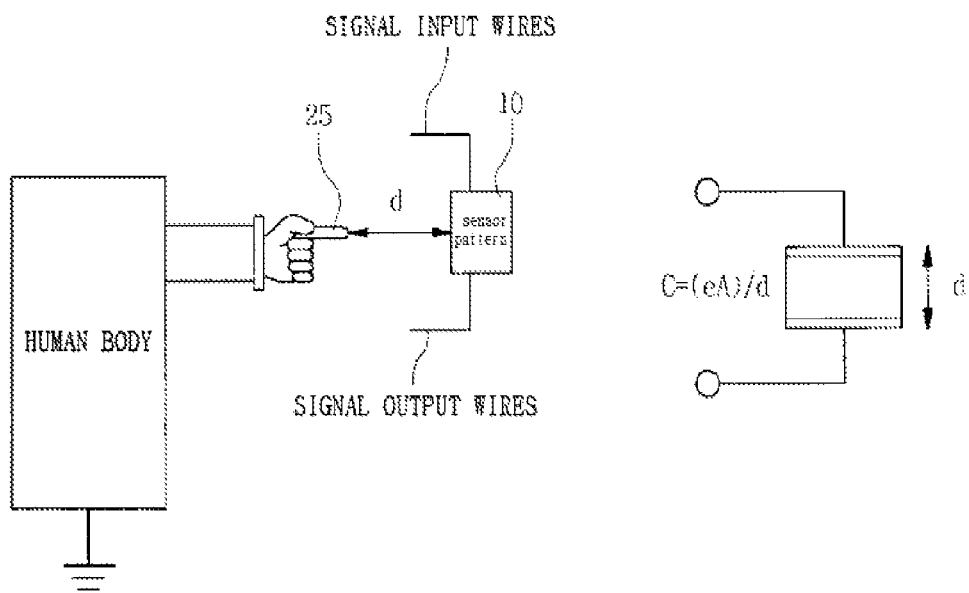
FIG. 7 is a conceptual view depicting a principle of detecting a touch input.

Prior to describing embodiments of the present invention, a principle that detects a touch input in the present invention will be described briefly with reference to FIG. 7. As shown in FIG. 7, it is assumed that when a finger 25 or a conductive touch unit similar to the finger approaches to a sensor pad 10, a distance between the finger 25 and the sensor pad 10 is an interval "d" and an opposite area is "A." An electrostatic capacitance "C" is formed between the finger 25 and the sensor pad 10 as shown in a right-side equivalent circuit of FIG. 7 and a numerical formula. If a voltage or current signal is applied to a signal input line of the sensor pad 10 having the electrostatic capacitance "C," charges of a magnitude "Q" are accumulated and a voltage relationship formula is formed as V=Q/C. As a result, the electrostatic capacitance "C" accumulates the charges "Q." In the present invention, when a voltage difference having a correlation with respect to the magnitude of the electrostatic capacitance "C" occurs in the sensor pattern 10 connected with the touch detection sensor, a touch input is detected by using the detected voltage difference.

Figure 8:
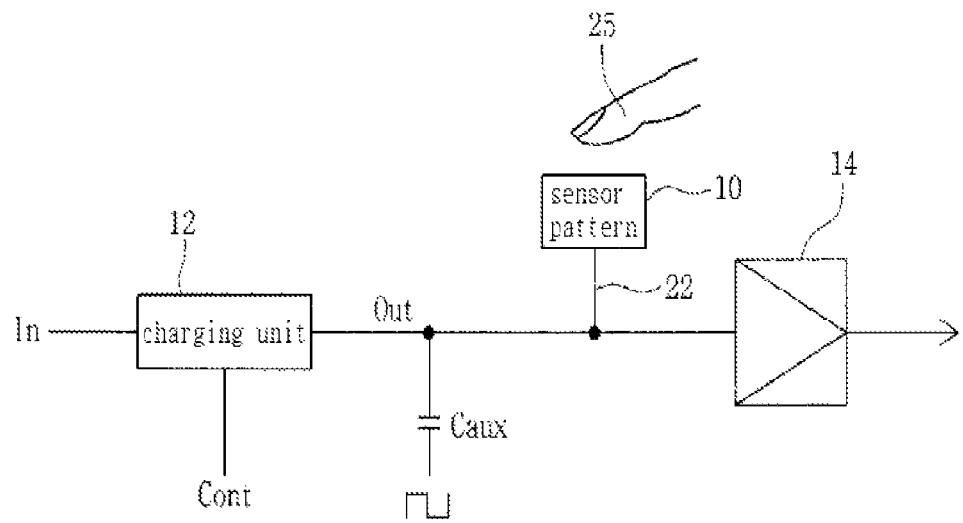
FIG. 8 is a circuit diagram illustrating a basic structure of a touch detection device according to an embodiment of the present invention.

FIG. 8 is a circuit diagram illustrating a basic structure of a touch detection device according to the present invention. Referring to FIG. 8, the touch detection device according to the present invention has a basic structure including a charging unit 12, a sensor pattern 10, a sensor signal line 22, an auxiliary capacitor Caux, and a touch detection sensor 14.

In FIG. 8, the charging unit 12 is a unit for supplying a pre-charge signal to the sensor pattern 10, in which the pre-charge signal is a voltage that is applied to all capacitors connected to the touch detection sensor 14 as a constant DC voltage to charge the capacitors, prior to detecting touch inputs. Thus, the charging unit 12 is a switching device that performs a switching operation according to a control signal supplied to the ON/OFF control terminal, or a linear device such as an OP-AMP that supplies a signal based on a control signal. As shown, when a three-terminal type switching device is used as the charging unit 12, a proper charging voltage may be supplied to the sensor pattern 10 at a required point in time by using a control signal supplied to the ON/OFF control terminal and a signal fed to the input terminal. A DC voltage including zero V, or an alternating AC voltage such as square, triangular or sinusoidal waves, may be used as the charging voltage.

The sensor pattern 10 is formed of a transparent conductor or metal. In the case that the sensor pattern 10 is mounted on a display device and is formed as a transparent conductor, the transparent conductor is formed of a transparent conductive material, such as ITO (Indium Tin Oxide), ATO (Antimony Tin Oxide), CNT (Carbon Nano Tube), or IZO (Indium Zinc Oxide) or a transparent material with conductive characteristics similar to the ITO, ATO, CNT, or IZO. In the case that the sensor pattern 10 is not mounted on the display device, but is applied as a touch keyboard or a touch key pad that is used for a refrigerator or monitor, the sensor pattern 10 may be formed of a non-transmissive material such as metal.

The sensor pattern 10 may be patterned in various forms. For example, the sensor pattern 10 may be arranged in a dot-matrix form in which isolated islands are arranged in a matrix form in an active region of a substrate 50, or the sensor pattern 10 may be arranged so that linear patterns are arranged lengthwise and crosswise on the substrate 50. A form of the sensor pattern 10 will be described in an embodiment to be described later.

The sensor signal line 22 is a signal line for detecting the presence of a touch input when a finger 25 or a touch unit (for example, such as a capacitive touch pen) having a conductive characteristic similar to that of the finger 25 approaches the sensor pattern 10. The sensor signal line 22 is a signal line that connects the sensor pattern 10 and the touch detection sensor 14, and may be formed of the same conductive transparent material as that of the sensor pattern 10. However, in some cases, the sensor signal line 22 may be formed of a non-transmissive material such as metal. The specific embodiments of the sensor signal line 22 will be described later.

The auxiliary capacitor (Caux) is an element to which a driving voltage is applied for detection of a touch input in the present invention, in which one end of the auxiliary capacitor (Caux) is connected to the touch detection sensor 14, and to the other end of which a driving voltage is applied. Here, the reference characters "Caux" is a symbol that represents both the name and magnitude of a capacitor. For example, the symbol "Caux" means a capacitor named Caux and simultaneously means a capacitance having Caux in magnitude. Other capacitor symbols such as Ct, Cvcom and Cp to be described later represents both the names and magnitudes of the capacitors.

As illustrated, the output terminal (Out) of the charging unit 12 is connected to the touch detection sensor 14. In addition, one end of the auxiliary capacitor (Caux) is connected to the output terminal (Out) of the charging unit 12, and a driving voltage is applied to the other end of the auxiliary capacitor (Caux). The drive signal is an alternating voltage, and is a periodic or non-periodic waveform such as a square, sinusoidal, or triangular wave. A voltage that is proportional to the size of the alternating driving voltage is derived and detected from the touch detection sensor 14 or the sensor pattern 10. The voltage is detected at the connecting point between the touch detection sensor 14 and the sensor pattern 10. Accordingly, the expression that a signal is detected at the sensor pattern 10 or at the touch detection sensor 14 means that the signal is detected at the connecting point between the sensor pattern 10 and the touch detection sensor 14 throughout this specification.

Figure 9:
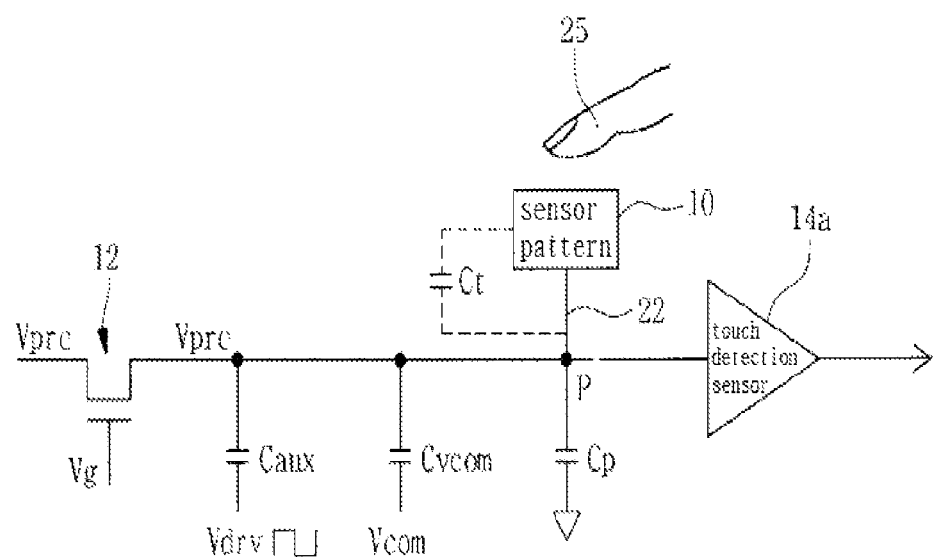
FIG. 9 is a circuit diagram illustrating a touch detection device according to another embodiment of the present invention.

FIG. 9 shows an embodiment of the switching device in which a MOS (Metal Oxide Semiconductor) or FET (Field Effect Transistor) switch is used, and an Analog to Digital Converter (ADC) is used as an embodiment of the touch detection sensor 14. The ADC 14a converts detected analog signals to digital signals. The touch signal detected in this embodiment is converted into the digital signal and then is transferred to a signal processor 35 to be described later with reference to FIG. 15.

As shown in FIG. 9, if a bodily finger 25 approaches the sensor pattern 10 within a certain distance from the sensor pattern 10, a touch capacitance "Ct" is formed between the finger 25 and the sensor pattern 10. Ct is a value that is set by the relational formula of FIG. 7, and may be freely made by adjusting an interval between a touch unit such as a bodily finger 25 and the sensor pattern 10, and an opposite area of the sensor pattern 10. For example, if the sensor pattern 10 is selected as a large area, the touch capacitance "Ct" is also made to have a large value based on the relationship formula of FIG. 7. In contrast, if the sensor pattern 10 is selected as a small area (for example, 1 mm$^2$ or less), the touch capacitance "Ct" is also designed to have a small value. As an embodiment, the touch capacitance "Ct" may be designed to have a value of tens of fF (femto F) to tens of uF (micro F).

The symbol "Cp" of FIG. 9 is a parasitic capacitor. The "Cp" is the sum of values of capacitors other than capacitors defined as "Ct" or "Caux" and may be modeled as a capacitor whose one end is connected to the touch detection sensor 14 and the other end of which is connected to any ground. Thus, a plurality of differently grounded parasitic capacitors (Cp) can be formed, but only one ground is assumed in the present specification, and only one parasitic capacitor connected to the only one ground has been shown. The parasitic capacitor (Cp) may be a parasitic capacitor that occurs between the sensor signal line 22 and the display device, or a parasitic capacitor that occurs between the sensor signal lines 22 when a plurality of the sensor patterns 10 are provided in a dot matrix form, and thus the sensor signal lines 22 are wired in parallel to each other.

Referring to FIG. 9, a pre-charge voltage (Vpre) is applied to the input terminal of the charging unit 12, and the pre-charge voltage (Vpre) is output through the output terminal when the switching device is turned on by a control voltage (Vg) which is applied to a control terminal. Thus, all capacitors connected to the output terminal of the charging unit 12 are charged as the pre-charge voltage (Vpre).

According to an embodiment, assuming that the switching device is turned on when Vpre is 3 V and Vg varies from 0 V (Zero Volt) to 10 V, the auxiliary capacitor (Caux), the touch capacitance (Ct), and the parasitic capacitor (Cp) are charged as 3 V. After being charged, the control voltage (Vg) of the switching device is fallen from 10 V to 0 V to thus turn off the switching device, and a point "P" of the touch detection sensor is in a high-impedance state, to thus isolate electric charges at the point "P" and then an alternating driving voltage is applied to the auxiliary capacitor (Caux). In this case, the magnitude of the voltage detected at the point "P" depends on the magnitude of the capacitors connected to the point "P" and the magnitude of the driving voltage.

At this point, assuming Caux and Cp are fixed values, and the magnitude of the driving voltage is constant, the magnitude of the voltage detected at the point "P" depends on the touch capacitance (Ct). Thus, since the voltage detected in the touch detection sensor 14 varies depending on the magnitude of the touch capacitance (Ct), it is possible to detect the presence of the touch input by detecting the voltage difference and to compute the opposite area between the sensor pattern 10 and the touch input instrument such as the finger 25.

In this embodiment, it was assumed as follows. The voltage drop due to the on-resistance (Rdson) of the switching device was ignored. In addition, the magnitude of the auxiliary capacitor (Caux) is determined at the manufacturing process of the auxiliary capacitor (Caux), and thus once the magnitude of the auxiliary capacitor (Caux) is determined, the magnitude of the auxiliary capacitor (Caux) does not change. In addition, the magnitude of the parasitic capacitance (Cp) does not also change.

Meanwhile, in the case that the sensor pattern 10 of FIG. 9 is mounted as a touch screen panel on the upper surface of the display panel or is embedded in the display device, a common electrode capacitor (Cvcom) is formed between the sensor pattern 10 and the common electrode of the display device. Otherwise, a common electrode capacitor (Cvcom) may be artificially formed by forming a common electrode 220 on the other surface of the substrate in which the sensor patterns 10 are formed.

Figure 10:
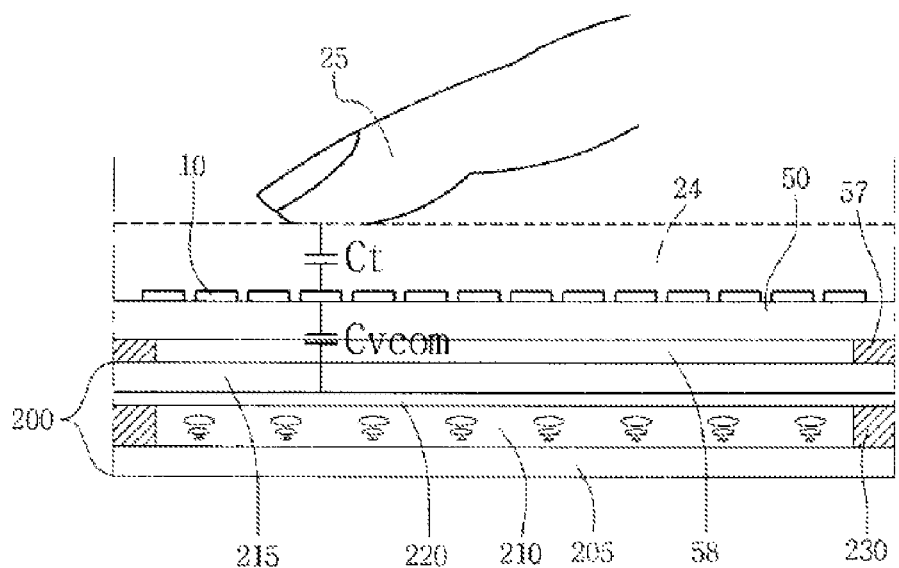
FIG. 10 is a cross-sectional view showing a configuration of sensor patterns according to an embodiment of the present invention.
Figure 11:
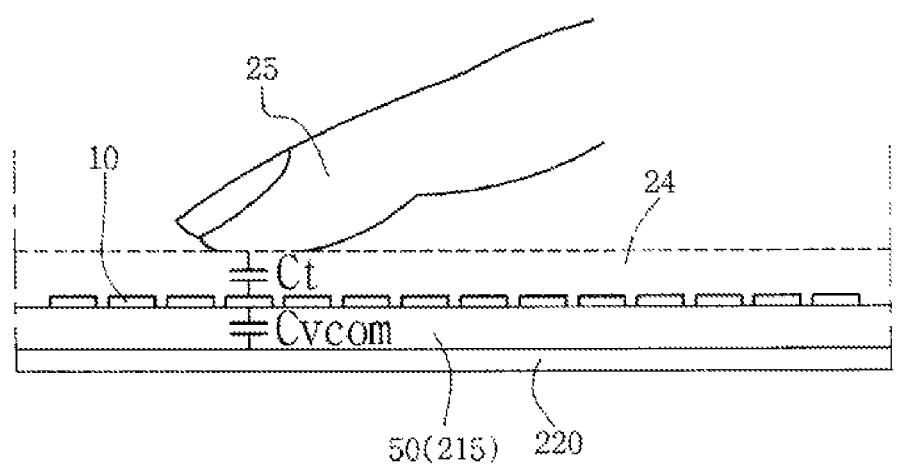
FIG. 11 is a cross-sectional view showing a configuration of sensor patterns according to another embodiment of the present invention.

FIG. 10 is a cross-sectional view showing a configuration of sensor patterns according to an embodiment of the present invention, and FIG. 11 is a cross-sectional view showing a configuration of sensor patterns according to another embodiment of the present invention. FIG. 10 illustrates that the sensor patterns 10 are mounted on a substrate that is formed separately from the display device, and FIG. 11 illustrates that the sensor patterns 10 are embedded in the display device, or a common electrode 220 is formed on the other surface of the substrate in which the sensor patterns 10 are formed. Referring to FIGS. 10 and 11, the formation of the common electrode capacitor (Cvcom) will be described as follows.

As shown in FIG. 10, the display device 200 has the common electrode 220. An AMOLED display device does not have a common voltage that functions to display the quality of image, but a virtual electric potential layer that can form the common electrode capacitor (Cvcom) of FIG. 9 is formed between the TFT substrate 205 and the sensor pattern 10, which is also named a common electrode.

The display device 200 may be formed in various forms as described above. The common electrode 220 may be an electrode of a common voltage (Vcom) in a liquid crystal display (LCD), or may be one of other types of electrodes. Among a variety of display devices, the LCD has been illustrated in the embodiment of FIG. 10.

In the display device 200 shown in FIG. 10, liquid crystal is sealed and filled between a lower-side thin film transistor (TFT) substrate 205 and an upper-side color filter 215, to thus have a structure of forming a liquid crystal layer 210. To seal the liquid crystal, the TFT substrate 205 and the color filter 215 are joined by sealants 230 at their outer portions. Although they are not shown, polarizing plates are attached on the top and bottom of the LCD panel, and besides optical sheets such as a back light unit (BLU) and a brightness enhancement film (BEF) are provided.

As shown, a substrate 50 of a touch screen panel is provided on top of the display device 200. As shown in FIG. 10, the substrate 50 is attached to the upper portion of the display device 200 at the outer portion thereof, through the medium of an adhesive member 57 such as a double adhesive tape (DAT), and an air gap 58 is formed between the substrate 50 and the display device 200.

Figure 5:
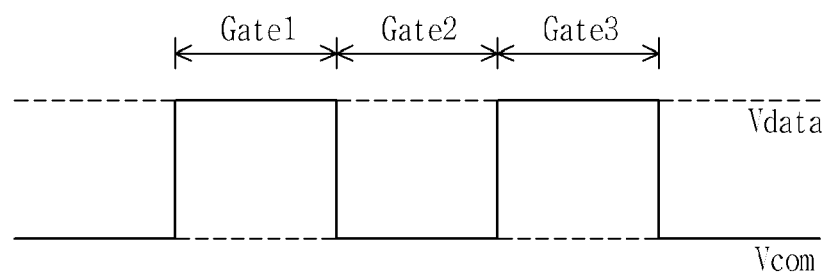
FIG. 5 is a waveform diagram illustrating a common voltage waveform of a liquid crystal display device.

A common voltage level alternating at a predetermined frequency and whose magnitude varies, or a common voltage direct-current (DC) level of a constant magnitude is applied to the common electrode 220 of the display device 200 as shown in FIG. 10. For example, a line-inversion type small-sized LCD has an alternating common voltage of the common electrode 220 as shown in FIG. 5, and the other dot-inversion type LCDs such as a notebook computer, monitor, or TV have a common voltage direct-current (DC) level of a constant magnitude voltage.

As shown, the common electrode capacitance (Cvcom) is formed between the sensor pattern 10 and the common electrode 220 of the display device 200. If a certain pre-charge signal is applied to the sensor pattern 10, the common electrode capacitance (Cvcom) will have a predetermined voltage level by a charging voltage. In this case, one end of the common electrode capacitance (Cvcom) is grounded with the common electrode 220 and so, when a voltage applied to the common electrode 220 is an alternating voltage, the electric potential of the sensor pattern 10 that is at the other end of the common electrode capacitance (Cvcom) will alternate by the alternating voltage applied to the common electrode 220. When the DC voltage is applied to the common electrode, the electric potential of the sensor pattern 10 does not alternate.

Meanwhile, a reference numeral 24 in the drawing denotes a protective layer 24 to protect the sensor pattern 10.

FIG. 11 shows an embodiment of the case where the sensor pattern 10 is built in the display device. Referring to FIG. 11, the substrate 50 that configures the touch screen panel may be a color filter 215 that is a part of the display device. As shown, the common electrode 220 is formed at the lower portion of the color filter 215, and the sensor patterns 10 are patterned on the top surface of the color filter. In the FIG. 11 embodiment, the protective layer 24 is replaced by a polarizer.

In this embodiment, the common electrode capacitance (Cvcom) is also formed between the common electrode 220 and the sensor pattern 10. If an alternating voltage is applied to the common electrode, the electric potential of the sensor pattern 10 is induced and alternates by the alternating voltage and if a DC voltage is applied to the common electrode, the electric potential of the sensor pattern 10 does not alternate by the common voltage of the common electrode.

In addition, in the embodiment of FIG. 11, the sensor patterns 10 are patterned on the top surface of the substrate 50 and the common electrode 220 is artificially formed on the lower surface of the substrate 50 as an example. In this case, the protective layer 24 is a layer to protect the sensor patterns 10. For example, the protective layer 24 may be formed of a glass or plastic film. If a protection panel such as reinforced glass is attached on the upper surface of the substrate 50, the protective layer 24 can be removed.

In this case, the common electrode capacitance (Cvcom) is also formed between the sensor pattern 10 and the common electrode 220. A structure of artificially forming the common electrode 220 on the rear surface of the sensor pattern 10 as described above, can be selected for the purpose of forming the touch screen panel so as to be separated from the display device 200 and avoiding the noise coming from the display device 200.

In the three embodiments described with reference to FIGS. 10 and 11, in the case that the voltage of the sensor pattern 10 is synchronized with the alternating common voltage and thus alternates, the pre-charge voltage through the charging unit 12 should proceed to avoid the rising edge and falling edge of the alternating voltage, to thereby avoid influences due to the alternating common voltage, and detailed description of waveforms will be described later.

Referring to the circuit diagram of FIG. 9, the auxiliary capacitor (Caux), the touch capacitance (Ct), the common electrode capacitance (Cvcom), and the parasitic capacitance (Cp) acting on the sensor pattern 10 are connected to the output terminal of the charging unit 12. Thus, when a pre-charge signal such as any voltage or current is applied to the input terminal of the charging unit 12 at a state where the charging unit 12 has been turned on, Caux, Ct. Cvcom, and Cp are charged. Thereafter, if the charging unit 12 is turned off, the charged signal is isolated unless the charged signals are separately discharged from the four capacitors Caux, Ct, Cvcom, and Cp.

To stably isolate the charged signals, the input end of the touch detection sensor 14 has a high-impedance (or Hi-z) state. Preferably, the input end of the touch detection sensor 14 has an impedance of at least one Mohm(Mega Ohm). If a touch input is observed while discharging the signals charged in the four capacitors, the charged signals are isolated in the other ways, or the signals are quickly observed at the time of discharge initiation, there is no need to inevitably have a high-impedance (or Hi-z) state at the input end of the touch detection sensor 14.

The touch detection sensor 14 detects whether or not a signal level of the sensor pattern 10 is shifted. Preferably, the touch detection sensor 14 detects whether or not a voltage difference occurs as a difference in the magnitude of a voltage of the sensor pattern 10 at the time of occurrence of a touch input (that is, when Ct is formed), in contrast to the magnitude of a voltage of the sensor pattern 10 at the time of non-occurrence of a touch input (that is, when Ct is not formed), to thus acquire a touch signal. The touch detection sensor 14 may have a wide variety of devices or circuit configuration. In the embodiments to be described later, examples in which a switching device and a differential amplifier are used as the touch detection sensor 14 will be described, but the configuration of the touch detection sensor 14 is not limited thereto.

Figure 12:
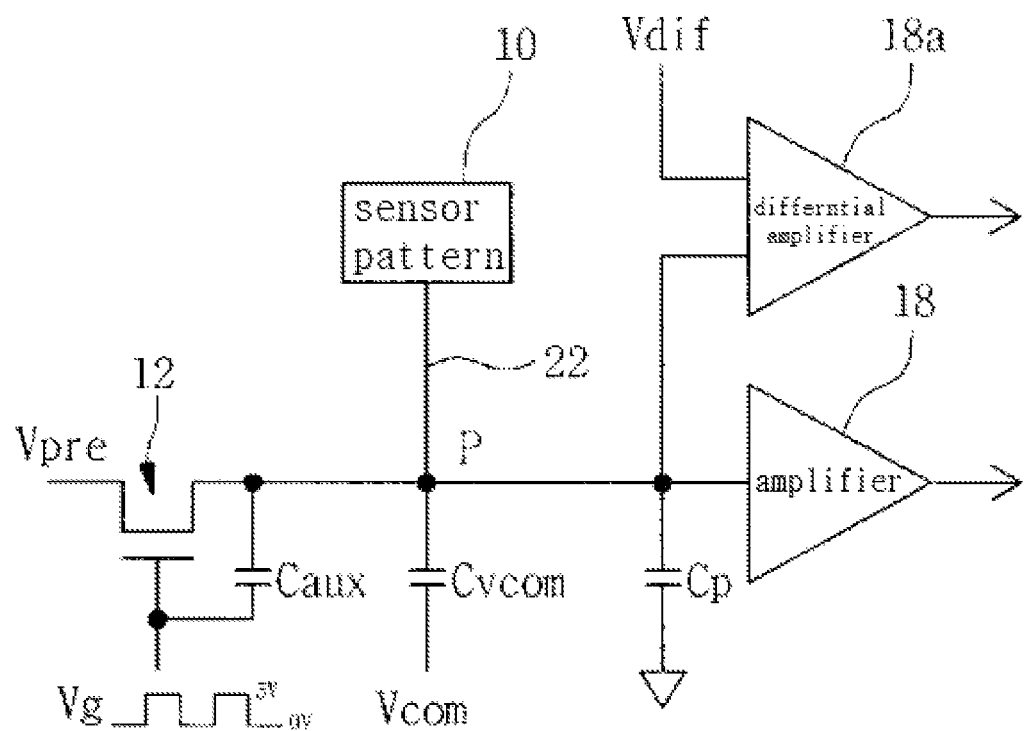
FIG. 12 is a circuit diagram illustrating a touch detection device according to still another embodiment of the present invention.

Unlike the connection method of the auxiliary capacitor (Caux) of FIG. 9, one side of the auxiliary capacitor (Caux) is connected to the control terminal of the charging unit 12 in the case of the embodiment of the touch detection sensor of FIG. 12. In this embodiment, the magnitude of the signal applied to the auxiliary capacitor (Caux) or the point in time at which the signal is applied, is dependent on the operation of the control terminal of the charging unit 12, as drawbacks, but the auxiliary capacitor (Caux) can be embedded in the charging unit 12, and a portion of forming the driving voltage applied to the auxiliary capacitor (Caux) does not exist separately, as advantages.

The voltage difference of the sensor pattern 10 due to the auxiliary capacitor (Caux) and the driving voltage applied to the auxiliary capacitor (Caux) at the time of non-occurrence of a touch input is determined by following Equation 1.

$$\Delta Vsensor = \pm(Vh - Vl)\frac{Caux}{Caux + Cvcom + Cp} \quad 1$$

Since Ct is added in parallel in the touch detection sensor 14 at the time of occurrence of a touch input, the voltage difference of the sensor pattern 10 is determined by following Equation 2.

$$\Delta Vsensor = \pm(Vh - Vl)\frac{Caux}{Caux + Cvcom + Cp + Ct}, \quad 2$$

In Equations 1 and 2, $\Delta V sensor$ is a voltage difference in the sensor pattern 10 or the touch detection sensor 14, Vh is a high level voltage of the drive signal applied to the auxiliary capacitor (Caux), or a turn-on voltage applied to a control terminal of the charging unit 12, Vl is a low level voltage of the drive signal applied to the auxiliary capacitor (Caux) or a turn-off voltage applied to the control terminal of the charging unit 12. Cvcom is a common electrode capacitance, Cp is a parasitic capacitance, and Ct is a touch capacitance.

The touch detection sensor 14 detects a voltage difference that is a difference in voltages between Equations 1 and 2 in the sensor pattern 10 by using Equations 1 and 2, which will be described below in detail.

In Equations 1 and 2, Vh and Vl are values that may be easily set up. Cvcom may be obtained from following Equation 3.

$$Cvcom = \varepsilon 1 \frac{S1}{D1} \qquad 3$$

In Equation 3, ∈1 may be obtained from the composite dielectric constant (or permittivity) of media existing between the sensor pattern 10 and the common electrode 220. For example, since the specific dielectric constant is 3 to 5, in the case of glass, the dielectric constant of the substrate 50 may be obtained by multiplying the specific dielectric constant of glass by the dielectric constant of vacuum. In the case of FIG. 10, since glass, an air space, a polarization plate, and an adhesive for attaching the polarization plate onto glass exist between the sensor pattern 10 and the common electrode 220. S1 is an opposite area between the sensor pattern 10 and the common electrode 20, which will be easily calculated. In the case that the common electrode 220 is formed over the entire lower surface of the color filter 215 as shown in FIG. 10, the opposite area S1 is determined by an area of the sensor pattern 10. In addition, D1 is a distance between the sensor pattern 10 and the common electrode 220, and thus corresponds to thickness of the medium 50.

As seen, Cvcom is a value that may be easily obtained and set.

The touch capacitance Ct may be obtained from following Equation 4.

$$Ct = \varepsilon 2 \frac{S2}{D2} \qquad 4$$

In Equation 4, the permittivity ∈2 may be obtained from a medium between the sensor pattern 10 and the finger 25. If reinforced glass is attached on the top surface of the substrate 50, in FIG. 10, the permittivity ∈2 can be obtained by multiplying the specific dielectric constant of the reinforced glass by the dielectric constant of vacuum. S2 corresponds to an opposite area between the sensor pattern 10 and the finger 25. If the finger 25 covers the entire surface of a certain sensor pattern 10, S2 corresponds to the area of the certain sensor pattern 10. If the finger 25 covers part of a certain sensor pattern 10, S2 will be reduced from the area of the sensor pattern 10, by an area of the certain sensor pattern that is not covered with the finger 25. In addition, D2 is a distance between the sensor pattern 10 and the finger 25, and thus corresponds to thickness of reinforced glass or the planarization layer 24 that is put on the upper surface of the substrate 50.

As described above, Ct is a value that can be also easily obtained, and that can be also set up by using the material and thickness of the protection panel 24 or the reinforced glass that is put on the upper surface of the substrate 50. In particular, according to the Equation 4, since Ct is proportional to the opposite area between the finger 25 and the sensor pattern 10, a touch share of the finger 25 with respect to the sensor pattern 10 can be calculated from the Ct.

The touch detection sensor 14 detects whether or not there is a voltage difference that is a difference in the magnitude of a voltage due to the Equation 2 in comparison with the magnitude of a voltage due to the Equation 1. The touch detection sensor 14 may include an amplifier to amplify a signal from the sensor pattern 10, an analog to digital converter (ADC), a voltage to frequency converter (VFC), a flip-flop, a latch, a buffer, a transistor (TR), a thin film transistor (TFT), a comparator, a digital to analog converter (DAC), an integrator, a differentiator, etc., or a combination of these components.

FIG. 9 illustrates the touch detection sensor 14 includes an analog to digital converter (ADC) 14a. Referring to FIG. 9, the sensor pattern 10 is connected to the input terminal of the ADC 14a. Thus, the voltage difference in the sensor pattern 10 is detected through the input terminal of the ADC 14a. As shown, if a junction between the sensor pattern 10 and the input terminal of the ADC 14a is P, the electric potential Vp of the junction P is affected by the touch capacitance Ct as expressed in the Equations 1 and 2.

Meanwhile, as described above, the ADC 14a shown in FIG. 9 is an analog to digital converter (ADC) having a buffer input with a high impedance state, or is configured by a combination of such a buffer. In the case that throughout this specification, the ADC or the differential amplifier is used as part of the touch detection sensor 14, it has deemed to have been combined with the buffer of the high-impedance state.

As shown, a driving voltage that has a certain pitch and alternates is applied to one end of the auxiliary capacitor (Caux). Although not shown, in one embodiment, the driving voltage is a CMOS output of an inverter or an "AND Gate", or is the output of a device that may output an alternating voltage like the output of an OP-AMP. Thus, the electric potential of Vp is in synchronization with the driving voltage applied to the auxiliary capacitor (Caux), and alternates, at a state where the auxiliary capacitor (Caux) is pre-charged (or charged) by the charging voltage expressed as Vpre. Thereafter, while a supply of the charging voltage and alternation of the driving voltage continue successively, Vp has the magnitude of the voltage of the Equation 1 at the time of non-occurrence of a touch input. If a touch input occurs, Ct is added in the denominator of the Equation 1, to thus become Equation 2. Therefore, the voltage of Vp is reduced, and thus the voltage difference occurs, which is obtained by subtracting the Equation 2 from the Equation 1.

Figure 13:
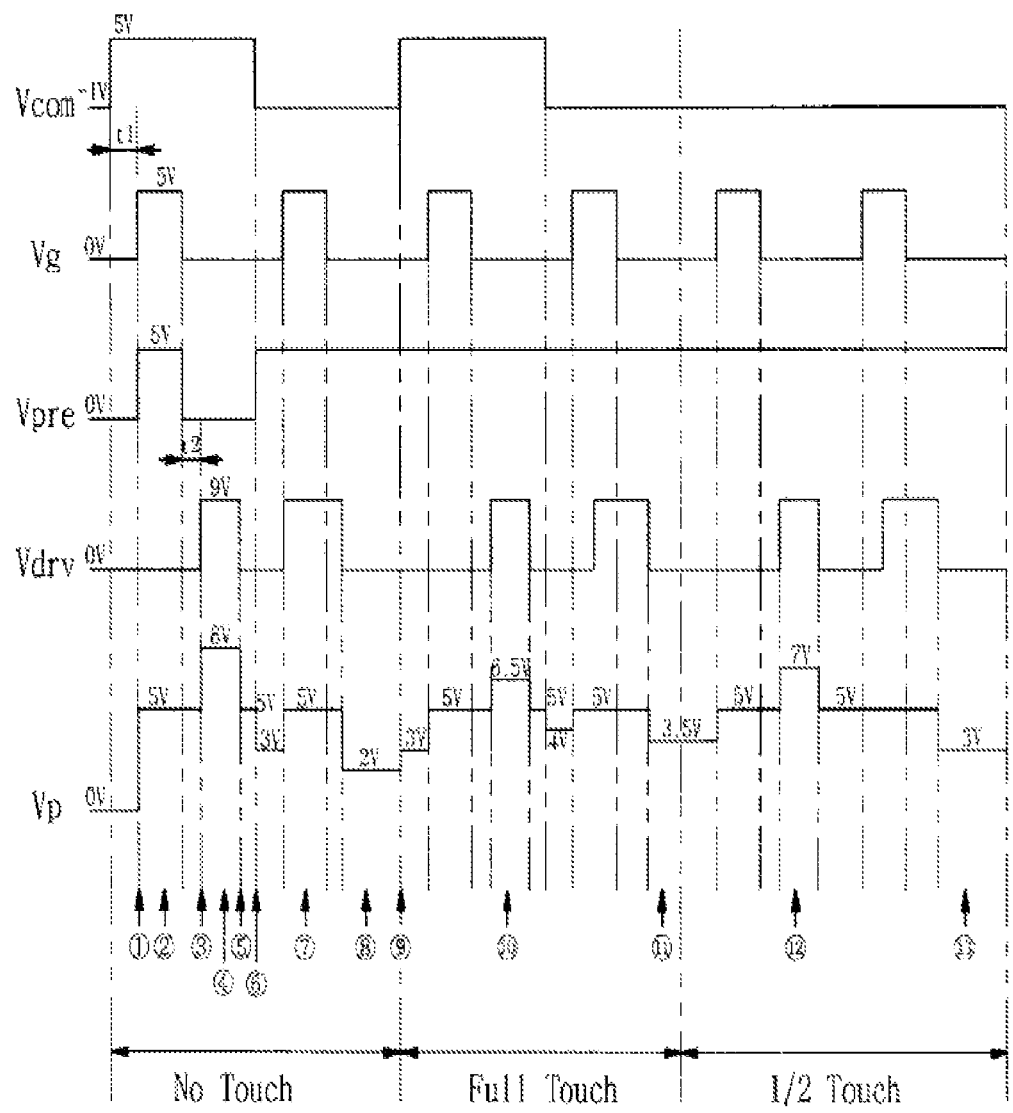
FIG. 13 is a waveform diagram illustrating a process of detecting a touch signal in the present invention.

FIG. 13 is waveform diagram illustrating a process of detecting a touch signal in the embodiment of FIG. 9. Referring to FIG. 13, a method of detecting a touch signal by using a voltage difference will be described below.

In the FIG. 13 embodiment, the waveforms are divided into three areas. The first area of FIG. 13 is an interval named a "No Touch" area where no touch inputs occur and there is no touch capacitance (Ct). The second area of FIG. 13 is an interval named a "Full Touch" area where the finger 25 completely covers the sensor pattern 10 and the touch capacitance (Ct) of the Equation 4 is maximized. On the other hand, the last area positioned in the lower-right corner of FIG. 13 is an interval named a "½ Touch" area where the finger 25 covers only 50% of the sensor pattern 10 and the touch capacitance (Ct) has a size of 50% compared to the Ct of the "Full Touch" area.

As mentioned earlier, in one embodiment of the present invention, a common voltage may be an alternating voltage alternating with a constant frequency, or a DC voltage that does not alternate or an AC voltage that alternates aperiodically. In this embodiment, the common voltage alternates in the "No Touch" area and the "Full Touch" area, and has a DC voltage of 0 V (zero Volt) in the "½ Touch" area. It can be seen that the present invention can be carried out regardless of the form of the common voltage. However, the rising edge and the falling edge may be sensed even for the common voltage (Vcom) that is non-periodic, to thereby configure embodiments in the same method as that of the common voltage (Vcom) that is periodic of the present embodiment.

In order to proceed with the present embodiment, an unshown common voltage detector should detect the common voltage. If the waveform of the rising edge and falling edge of the common voltage is applied at an interval at which the voltage difference is detected in the case that the common voltage alternates with a certain size, the waveforms that are detected in the touch detection sensor 14 may be distorted due to the waveform of the common voltage. Accordingly, the present invention detects voltage differences of the pre-charge and touch signal while avoiding the points in time at which the rising edge and falling edge of the common voltage occur. However, in another embodiment, as in the exemplary embodiment of the present invention, both a voltage difference that occurs when the driving voltage is applied to one side of the auxiliary capacitor (Caux), and a voltage difference that occurs at the rising edge and falling edge of the common voltage may be detected together, to thus detect the touch input.

If a common voltage is a DC level that does no alternate, it is possible to detect a voltage difference that does not depend on the waveform of the common voltage. A drive IC 30 that will be described later may include a mode setter unit of setting a mode of detecting the common voltage in the case that the common voltage alternates, to thus sense the rising edge and falling edge of the common voltage and refer to the sensed rising edge and falling edge thereof, and a mode where the common voltage is not referred to when the common voltage does not alternate. Because of this action, when the common voltage does not alternate, it is possible to detect the voltage difference more easily.

As described above, when the common voltage is first detected and then the common voltage alternates, the voltage difference can be detected while avoiding the points in time at which the common voltage alternates. Thus, according to benefits of this approach, the voltage difference due to the touch input can be detected in any display devices in which the common voltage alternates or does not alternate.

*Embodiment in the "No Touch" Area

The waveform of the common voltage is first detected to then detect the edges of the waveform of the common voltage, and then the ON/OFF control terminal of the charging unit 12 is turned on after a predetermined time (indicated as 't1' in this embodiment) to thereby charge capacitors. The capacitors that are charged in the non-touch area are Caux, Cvom, and Cp. The intervals at which the capacitors are charged are intervals ② and ⑦ in FIG. 13.

The intervals ① and ⑥ in FIG. 13 are intervals at which voltage of Vp is dependent on the waveform of the common voltage by the alternating common voltage, in which the voltage of Vp is applied as 0 V at the interval ①, but the magnitude of the voltage of Vp is determined by a specific formula at the interval ⑥ which will be described later.

If the charging unit 12 is turned off after having charged the capacitors, the input end of the touch detection sensor 14 is in a Hi-z state, that is, in a high impedance state, and thus the charges stored in the capacitors remain isolated. As a result, the electric potential of the sensor pattern 10 is also maintained. In this example, the ON voltage of the charging unit 12 is 5 V and the OFF voltage thereof is 0 V.

The pre-charge signal (Vpre) is applied to 5 V as an example, and may be turned on and off in synchronization with the gate signal (Vg), or may remain always the ON state. The common voltage of the common electrode 220 of the display device 200 was assumed to be given 5 V at the high level, and −1 V at the low level.

Meanwhile, assuming the driving voltage (Vdrv) applied to the auxiliary capacitor (Caux) is 9 V at the high level, and 0 V at the low level, the charging operation is first performed and then the detection operation is performed at the rising time and falling time of the driving voltage, which are performed at the intervals ④ and ⑧, as shown in FIG. 13.

In the example in FIG. 13, when the pre-charge is performed at the intervals ② and ⑦, the electric potential of Vp becomes 5 V. In the waveform of FIG. 13, the effects of transients and noise at the charging and discharging time were ignored.

Thereafter, even if Vg is turned off, the charges stored on the capacitors remain isolated and the electric potential of Vp is kept at 5 V. The detection operation is performed at the intervals (the interval ④ and the interval ⑧), and thus a touch has not still occurred, the voltage by the Equation 1 is formed. Assuming that Caux, Cvcom and Cp are all one depending on the relative size, the driving voltage rises up at the interval ③, and the voltage of Vp rises up in synchronization with the rising driving voltage. The value of ΔVsensor at the interval ④ is "{9−(0)}*⅓" according to the Equation 1, so is 3 V. Thus, the electric potential (Vp) at the point P ranges from 5 V to 8 V and varies in synchronization with the size of the driving voltage. On the other hand, a waiting time t2 that is taken until the driving voltage varies after the pre-charge has occurred at the interval ② is several µs to several tens µs, as an example, but the waiting time t2 is preferably several µs.

The voltage detected at the interval ④ is stored in the memory and is used as comparison data to be compared with a voltage detected at the time of occurrence of a touch input. Thus, the detection voltage at the interval ④ in the "No Touch" area is measured and stored in the memory, at a state where no touch input occurs such as a "factory mode" (a part of a manufacturing process) or a "Calibration mode," and is used as reference data to detect a voltage difference in comparison with a "touch mode" when a touch input occurs.

If the detection operation is performed at the falling edge of the driving voltage (Vdrv) on the contrary with the above case, at the interval ⑤ after the interval ④, the value of ΔVsensor is "−{9−(0)}*⅓," and so is −3 V. Thus, the electric potential (Vp) at the point P will be changed from 8 V to 5 V. The data that has been measured through the operation process will be able to increase the reliability of the data.

Referring to FIG. 13, the common voltage alternates at the interval ⑥ in which voltage of Vp is determined by the following equation.

$$\Delta Vsensor = \pm(VcomH - VcomL)\frac{Cvcom}{Caux + Cvcom + Cp} \qquad 5$$

In the Equation 5, ΔVsensor represents a voltage difference in the sensor pattern 10 or the touch detection sensor 14. VcomH is a high level voltage of the common voltage applied to the common electrode capacitor (Cvcom), VcomL is a low level voltage of the common voltage applied to the common electrode capacitor (Cvcom), Cvcom is a common electrode capacitance, and Cp is a parasitic capacitance.

According to the Equation 5, at the interval ⑥ where the common voltage falls down, the size of ΔVsensor is "−{5−(−1)}*⅓," and so is −2 V, and the electric potential of Vp is 5 V before variation of the common voltage occurs. Thus, the electric potential of Vp is 3 V at the interval ⑥.

Since the voltage difference due to the touch can be detected even at the interval from the interval ⑤ to the interval ⑥, it is possible to detect whether or not a touch input occurs and to detect a touch area share in sensor pattern 10. This is because the detection voltage detected in the touch detection sensor 14 is calculated by the following Equation 6, if a touch input occurs from the interval ⑤ to the interval ⑥ and thus the touch capacitance Ct is produced.

In the Equation 6, Ct denotes the touch capacitance.

When comparing the Equations 5 and 6, it is the difference between the Equations 5 and 6 that Ct has been added to the denominator of the Equation 6. It can be seen that the magnitude of the voltage detected in the touch detection sensor 14 depending on the size of Ct, that is, a voltage difference that is a difference between the values of the Equations 5 and 6 represents a degree of the touch. However, since this method requires an alternating common voltage, it is impossible to detect the touch in the case that the common voltage does not alternate like the "½ Touch" area. However, the drawback can be solved by applying the alternating common voltage to the common electrode.

Since the interval ⑦ in FIG. 13 is a charging interval, the electric potential of Vp is charged as 5 V, and the driving voltage at the interval ⑧ falls down from high to low. Thus, ΔVsensor at the interval ⑧ is "−{9−(0)}*⅓," and so is −3 V, and the charging voltage that is 5 V at the point P is changed into 2 V.

*Embodiment in the Full Touch Area

Referring to FIG. 13, the area S in the Equation 4 is fully occupied by the finger 25 at the interval ⑨ in which Ct represents the maximum value. If the relative size of Ct is three (3) when compared to Cvcom or Caux whose relative size is one (1), ΔVsensor at the interval ⑨ is determined by the Equation 6, and ΔVsensor is "{5−(−1)}*⅙," and so is 1 V. Thus, the detection voltage is 2 V at the interval ⑧, the voltage is 3 V at the interval ⑨.

As mentioned earlier, since the voltage difference of 1 V (=2 V−1V) in ΔVsensor occurs when Ct exists and does not exist depending on whether or not the touch occurs in the Equation 6, the touch detection sensor 14 detects the voltage difference and thus detects whether or not a touch occurs and compute the opposite area between the sensor pattern 10 and the touch instrument such as the finger 25.

At the interval ⑩, ΔVsensor is determined by the Equation 2, and the size of ΔVsensor is "{9−(0)}*⅙" by the rising driving voltage and so is 1.5 V. Since the magnitude of the detection voltage is 5 V at the charging interval before the interval ⑩, the detection voltage is 6.5 V at the interval ⑩.

In the "No Touch" area, the magnitude of the detection voltage is 8 V at the interval ④ at which the magnitude of the detection voltage is defined by the Equation 1, and in the "Full Touch" area, the magnitude of the detection voltage is 6.5 V at the interval ⑩ at which the magnitude of the detection voltage is defined by the Equation 2. Accordingly, the voltage that is obtained by subtracting the Equation 2 from the Equation 1, that is, the voltage difference is 1.5 V. The touch detection sensor 14 detects the size of the voltage difference and determines whether or not a touch occurs.

At the interval ⑪, the detection voltage is defined by the Equation 2. The size of ΔVsensor is "{9−(0)}*⅙" that is 1.5 V at the interval ⑪. Since the charging voltage is 5 V just before the interval ⑪, the detection voltage is detected as 3.5 V. The detection voltage is 2 V due to the voltage difference defined by the Equation 1 in the "No Touch" area, but the detection voltage is 3.5 V at the interval ⑪. Thus, the difference in the voltages, that is, the voltage difference is 1.5 V, and thus is the same as the voltage difference that was described above. Thus, it can be seen that the size of the voltage difference has an identical value regardless of whether the driving voltage (Vdrv) is at the rising edge or falling edge. Accordingly, the voltage differences can be all detected at the rising edge or falling edge of the driving voltage (Vdrv).

*Embodiment of ½ Touch Area

Meanwhile, if the finger 25 partially covers the sensor pattern 10, the opposite area S2 between the finger 25 and the sensor pattern 10 becomes smaller in the Equation 4, and thus Ct also decreases. Thus, in the FIG. 13 waveform diagram, the size of the voltage difference will become smaller too. In other words, if the amount of the voltage difference is detected, the touch share of the finger 25 for the sensor pattern 10 can be computed. Such a function makes it possible to increase a touch resolution although the size and resolution of the sensor pattern 10 are limited. In addition, such a function makes it possible to detect the subtle changes in the touch coordinates and to draw a high-resolution picture by using the finger or other touch input instruments.

If the finger 25 covers 50% of the sensor pattern 10, Ct has a relative value of 1.5 that is half of the "Full touch" time by the Equation 4. In the "½ Touch" area, the common voltage does not alternate. Thus, there is no need to apply the driving voltage (Vdrv) to avoid the moment the common voltage alternates. Therefore, the detection time does not depend on Vcom and is randomly adjusted.

Since Ct is 1.5 at the interval ⑫, ΔVsensor is "{9−(0)}*¼.5," and so is 2 V. Since the charging voltage is 5 V just before the interval ⑫, the detection voltage is detected as 7 V at the interval ⑫. The detection voltage at the interval ⑬ at which the driving voltage (Vdrv) is at the falling edge, becomes 3 V in which 2 V is subtracted from 5 V that is the charging voltage. Thus, the touch detection sensor 14 measures a voltage difference that is a difference between values of the detection voltage at the interval ④ or ⑧ and the detection voltage at the interval ⑫ or ⑬, in the "No Touch" area, to thus make it possible to calculate the opposite area between the sensor pattern 10 and the finger 25.

FIG. 9 illustrates the case that the auxiliary capacitor (Caux) does not depend on the behavior of the ON/OFF control terminal of the charging unit 12, but FIG. 12 shows an embodiment of the case that the driving voltage (Vdrv) applied to the auxiliary capacitor (Caux) is dependent on the ON/OFF control signal of the charging unit 12. Such an embodiment has an advantage that the circuit is simple since there is no need to separately produce the driving voltage (Vdrv) applied to the auxiliary capacitor (Caux), but has some drawbacks that the driving voltage (Vdrv) depends on the control voltage of the charging unit 12, it is not possible to detect the voltage difference since the output terminal of the charging device 12 is not at the Hi-z state, that is, at the high impedance state, and the detection speed slows down since it is possible to detect the voltage difference at the time when the control voltage falls down. However, these drawbacks can be overcome by the fast charging operation and the fast detecting operation of the charging unit 12.

On the other hand, FIG. 12 shows the case that an amplifier 18 is used as the touch detection sensor 14. The amplifier 18 whose input end is at the Hi-z state, or that is combined with a buffer whose input end is at the Hi-z state can also reliably isolate a signal at the point P.

In the embodiment of FIG. 12, the fact that the electric potential at the point P varies by Ct to thus cause the voltage difference is the same as the embodiment of FIG. 9. However, the amplifier 18 is used as a detection unit that detects the voltage difference. The amplifier 18 amplifies the signal from the sensor pattern 10. Accordingly, since the voltage difference due to occurrence of a touch input is amplified and output, a touch signal can be reliably obtained even if the value of the voltage difference is small.

In addition to the amplifier 18, a differential amplifier 18a can be used. Referring to FIG. 12, the electric potential at the point P is input to the input terminal of the differential amplifier 18a in addition to the amplifier 18, and a reference voltage (Vdif) for forming a differential voltage is input to another input terminal of the differential amplifier 18a. If the reference voltage (Vdif) is input to the non-invert terminal of the differential amplifier 18a, a value that is obtained by subtracting the reference voltage (Vdif) from the electric potential at the point P and then by multiplying the subtraction result by an amplification factor of the differential amplifier 18a will be output as an output of the differential amplifier 18a. According to the advantage of this configuration, the level of the noise applied to the point P is made to be small, to thus calculate a signal more stably and increase the accuracy of the touch operation. In the embodiment of FIG. 12, the amplifier 18 and the differential amplifier 18a are not used simultaneously, but only one of two is connected to the point P.

Meanwhile, in FIG. 13, the pre-charge voltage (Vpre) is illustrated as a 5V single voltage, but the magnitude of pre-charge voltage (Vpre) may vary at the rising edge and falling edge of the driving voltage, and a plurality of pre-charge voltages may be used, as necessary. For example, the magnitude of the detection voltage is 8 V, at the interval ④ of FIG. 13, and thus may be beyond the scope of the resisting pressure in the case that a control IC whose resisting pressure is 5 V is used. In this case, the charging voltage (Vpre) can be applied with 1 V, and accordingly the detection voltage at the interval ④ becomes 4 V to thus make it possible to use the control IC in the range of meeting the resisting pressure of the control IC.

On the other hand, Cp may vary for each sensor pattern 10. For example, it is extremely difficult to uniformly design the location of the sensor pattern 10, the wiring length, and other external factors for each sensor pattern 10. In addition, Cvcom may also vary for each sensor pattern 10. If the voltage difference is large in size, such a deviation may be ignored, but the smaller size the voltage difference may have, the deviation for each sensor pattern 10 is not negligible.

Figure 14:
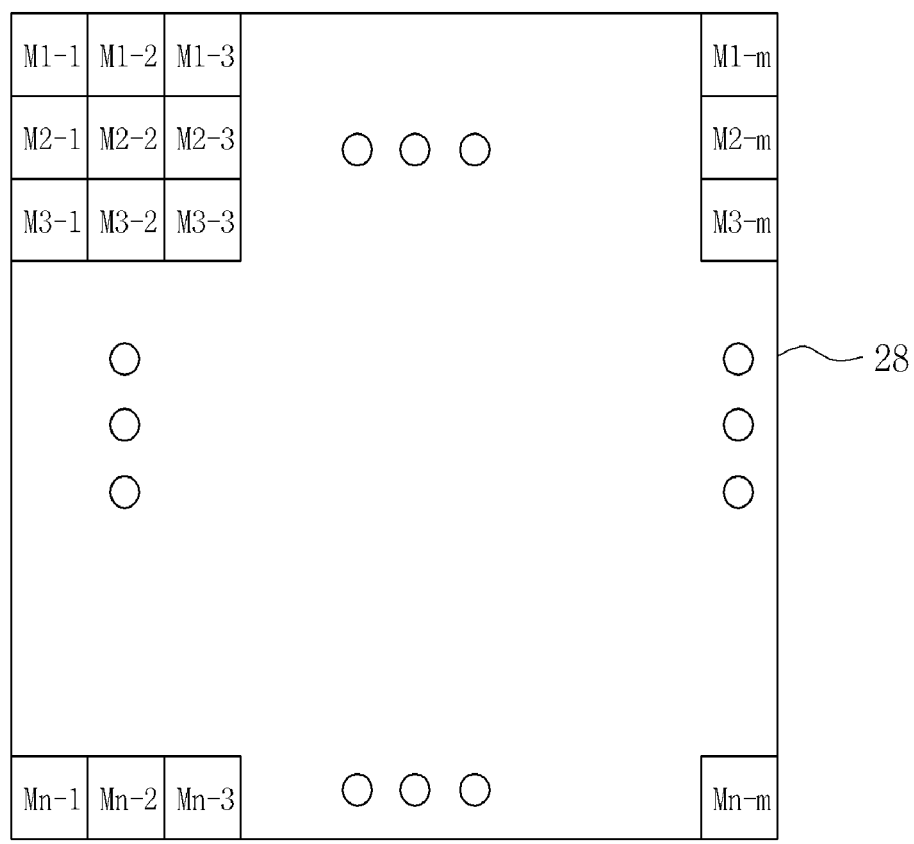
FIG. 14 is a schematic block diagram showing an example of a memory unit.

In order to solve the above problems, as shown in FIG. 14, the drive IC 30 further includes a memory unit 28 that stores the signal processing results of the touch detection sensor 14 or a signal processor 35 to be described later, when no touch occurs in the respective sensor patterns 10. The signal which is stored in the memory unit 28 is a value based on the unique Cp and the unique Cvcom of each sensor pattern 10 and may vary for each sensor pattern 10.

For example, the sensor patterns 10 can be scanned at once at the state where no touch occurs after the power is applied, or the output of the touch detection sensor 14 or the processing results of the signal processor 35 can be obtained at a "factory mode" that is the state where no touch occur before being shipped from a manufacturing factory. The factory default values are stored in the memory unit 28.

A value that is obtained when a touch occurs may be also stored in the memory unit 28. In addition, an extra memory unit that stores the value obtained when there is a touch may be further provided. In addition, the drive IC 30 compares values of an identical cell, and judges that a touch occurs when a voltage difference beyond a pre-set reference value occurs, to thus compute a touch share of the sensor pattern 10 through the operational computation.

In order to attenuate the influence of Cp, it is also possible to set a value of Caux or Ct to be relatively higher than that of Cp, in the Equations 1 and 2. Caux is built in the drive IC or mounted on the outside of the drive IC. When Caux is built in the drive IC, the size of Caux is determined at a manufacturing process of ICs. Even when Caux is mounted on the outside of the drive IC, a component whose size can be grasped is mounted. Therefore, since a relatively small Cp may be implemented, the influences of Cp that is determined by unknown factors may be minimized.

Referring to FIG. 14, when the sensor patterns 10 are arranged in the form of a dot-matrix pattern, and have a resolution of m*n, the memory unit 28 consists of a table with m rows and n columns. For example, the output of the differential amplifier 18a that has occurred at the time of non-occurrence of a touch input and that has been assigned at the uppermost-leftmost corner of the sensor pattern 10 may be stored in an address of M1-1. In addition, the signal stored in the memory unit 28 is referenced when it is detected whether or not a touch input occurs at the uppermost-leftmost corner of the sensor pattern 10.

The value stored in each address of the memory unit 28 may be periodically calibrated. The periodic calibration may be carried out when power is applied to the device, as described above, or in a dormant state. As described above, if the output of differential amplifier 18a is stored in the memory unit 28, at the time of non-occurrence of a touch input for each sensor pattern 10 (or respectively separately at the time of non-occurrence and occurrence of a touch input), periodically calibrated, and referenced at the time of detecting a touch signal, the touch signal may be stably acquired even in the case that a unique Cp is assigned for each sensor pattern 10.

Figure 15:
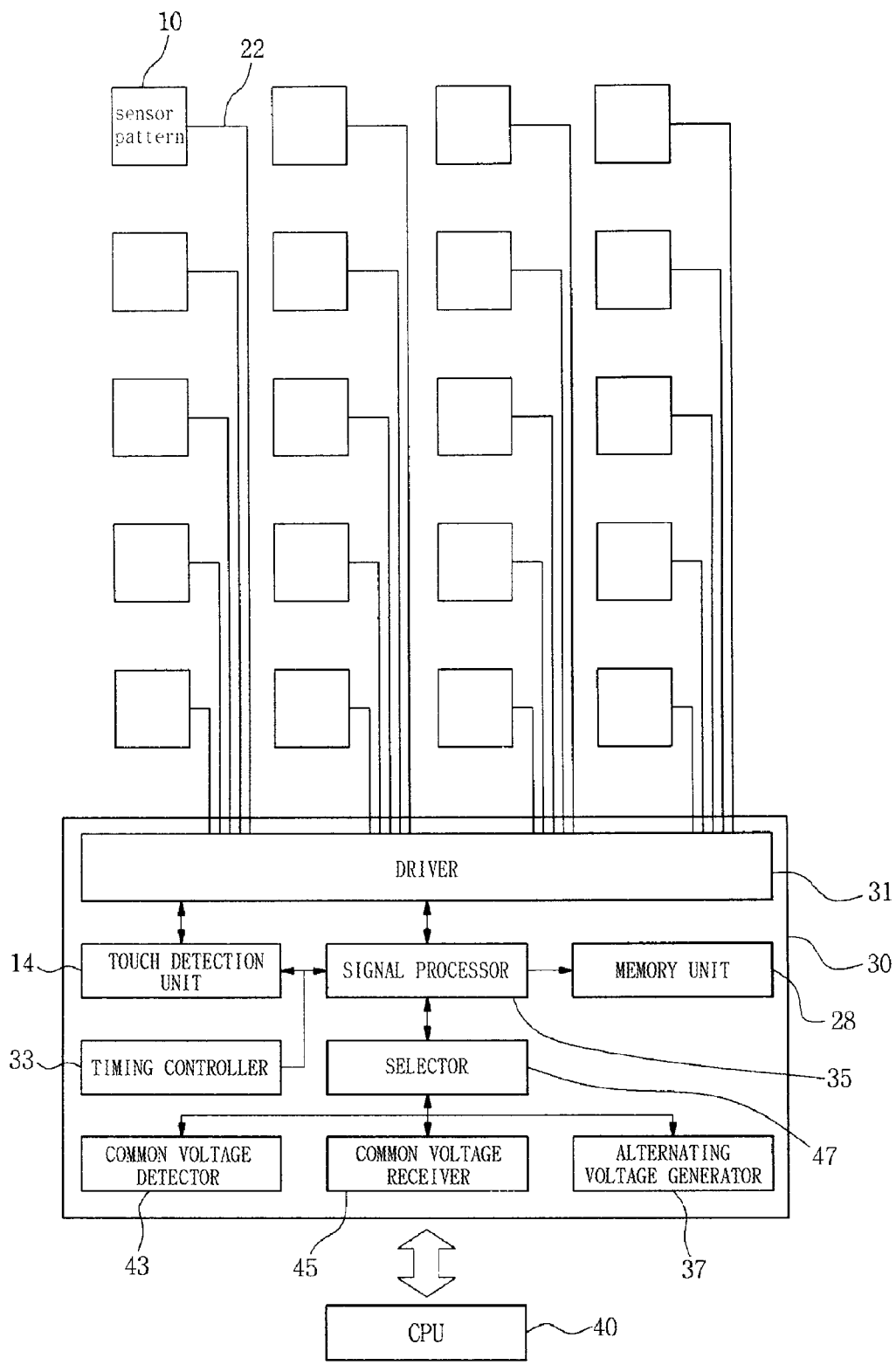
FIG. 15 is a schematic diagram showing a touch screen panel according to an embodiment of the present invention.
Figure 16:
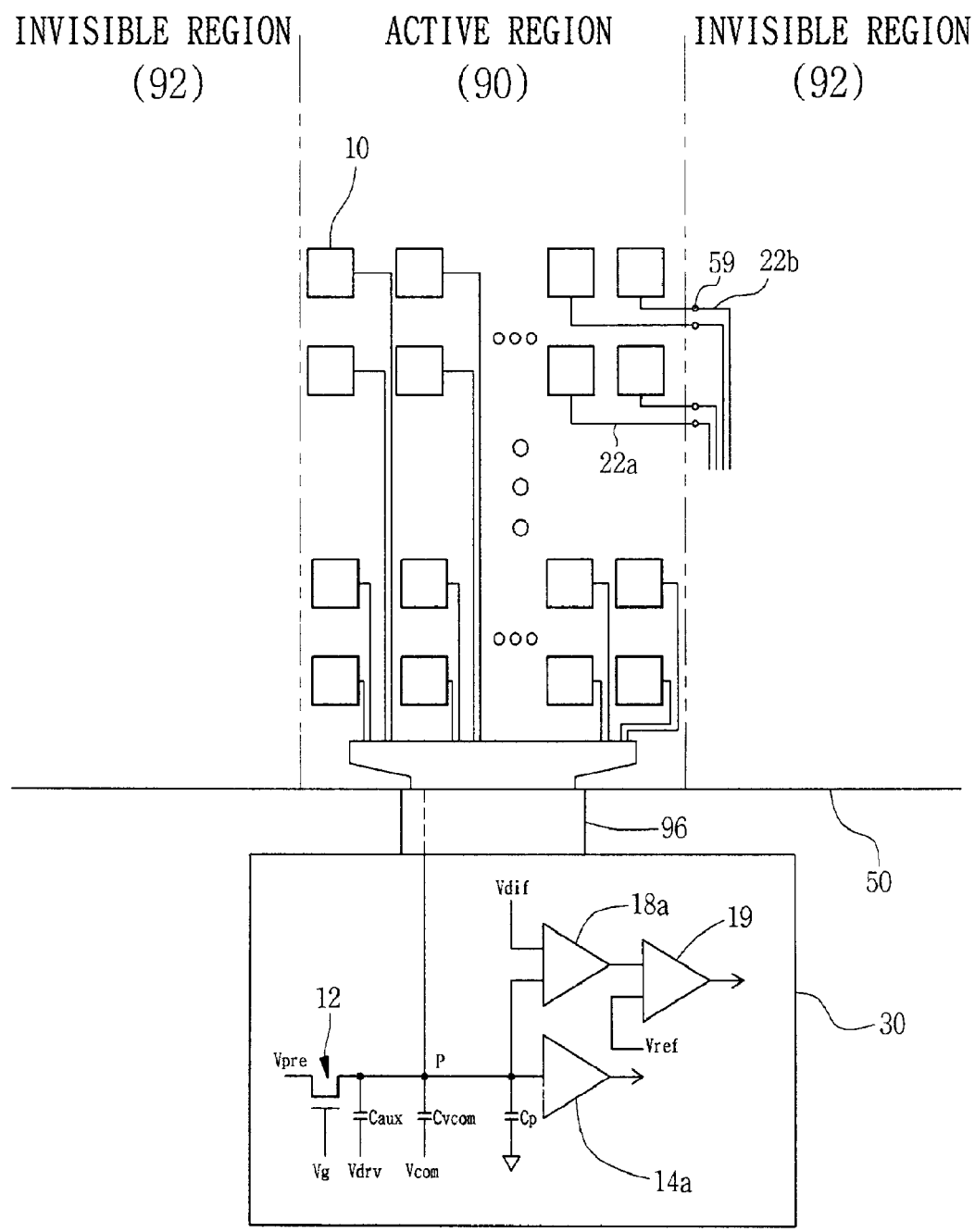
FIG. 16 is a schematic diagram showing a touch screen panel according to another embodiment of the present invention.

FIGS. 15 to 22 show embodiments of a touch screen panel according to the present invention, respectively. FIGS. 15 and 16 show embodiments employing the above-described touch detecting device of FIG. 9 or 12, in which the sensor pattern 10 is arranged in the form of a dot-matrix pattern.

A configuration of the drive IC 30 is shown at the lower portion of FIG. 15. The drive IC 70 includes a driver 31, a touch detection sensor 14, a timing controller 33, a signal processor 35, and a memory unit 28. In addition, the drive IC 70 further includes one of a common voltage detector 43, a common voltage information receiver 45, and an alternating voltage generator 37. In addition, as shown in FIG. 14, the drive IC 70 is configured to include all of the common voltage detector 43, the common voltage information receiver 45, and the alternating voltage generator 37, and select one of the common voltage detector 43, the common voltage information receiver 45, and the alternating voltage generator 37 by a selector 47.

A drive signal obtained from the drive IC 30 is delivered to a central processing unit (CPU) 40. The CPU 40 may be a CPU of a display device, a main CPU of a computer device, or a CPU of a touch screen panel itself. For example, an 8-bit or 16-bit microprocessor may be built in or embedded to process a touch signal. Although it is not shown in the drawing, a power supply may be further included in a system configuration in order to generate a high or low voltage of signals for detecting touch inputs.

The microprocessor embedded in the drive IC 30 may calculate touch input coordinates, to thus recognize gestures such as zoom, rotation, and move, and deliver data such as reference coordinates (or central point coordinates) and gestures to the main CPU. In addition, the microprocessor may calculate an area of a touch input to generate a zooming signal, calculate a strength of the touch input, and recognize only a user's desired GUI object (for example, only a GUI object whose area is frequently detected) as a valid input, in the case that a plurality of GUI objects are simultaneously touched, that is, the microprocessor may process data in various forms, and output the processed result.

The timing controller 33 generates a time divisional signal of several tens of milliseconds (ms), and the signal processor 35 transmits and receives signals to and from each sensor pattern 10 through the driver 31, respectively. The driver 31 provides the ON/OFF control signal (Vg) and the pre-charge signal (Vpre) of the charging unit 12. The ON/OFF control signal (Vg) is time divided by the timing controller 33 and sequentially or non-sequentially for each sensor pattern 10. As mentioned with reference to FIG. 13, the memory unit 28 is used to store an initial value at the time of non-occurrence of a touch input in each sensor pattern 10, or to store a signal at the time of occurrence of a touch input, and has unique absolute addresses for the respective sensor patterns 10.

As described above, the obtained coordinate values may be temporarily stored or the reference values at the time of non-occurrence of a touch input may be stored by using only one memory unit 28. Otherwise, a plurality of memory units are provided to thus separately store the reference values at the time of non-occurrence of a touch input and detected values at the time of occurrence of a touch input, respectively.

In the illustrated embodiment, the sensor pattern 10 has been illustrated as an example of a resolution of 4*5, but actually has a higher resolution. As a result, signals may be lost in the process of dealing with many signals. For example, in the case that the signal processor 35 is in a "busy" state, the touch drive signal is not recognized to thus miss a signal.

The memory unit 28 may prevent the loss of such a signal. For example, the signal processor 35 temporarily stores the detected touch signal in the memory unit 28. In addition, the signal processor 35 scans the entire sensor pattern 10 and then judges whether or not a missing signal exists with reference to the memory unit 28. If touch coordinates are stored in the memory unit 28 although signals have been lost in the signal processing, the signal processor 35 processes the corresponding touch coordinates as normal inputs.

The common voltage information receiver 45 directly receives the common voltage information of the common electrode 220 from the display device 200. In this case, it is very easy to obtain such information as the starting point, the size, the rising edge and the falling edge of the common voltage. In addition, the signal processor 35 can easily process signals in conjunction with the rising edge and falling edge of the common voltage. However, it is burdensome to have to transmit the common voltage information from the display device 200.

On the other hand, in the case that the common electrode 220 of the display device 200 has a constant DC level, the alternating voltage generator 37 is able to be forced to apply the alternating voltage to the common electrode 220. The alternating voltage generator 37 applies a voltage level alternating at a predetermined frequency to the common electrode 220 according to a time divisional signal of the timing controller 33. A frequency of the alternating voltage applied to the common electrode 220 can be adjusted by adjusting a resistor. Even in this case, the signal processor 35 can easily process signals in conjunction with the rising edge and falling edge of the common voltage. However, it is burdensome to have to transmit the common voltage information to the display device 200.

However, the common voltage detector 43 automatically detects the common voltage information, and thus is not required to transmit and receive information related to the common voltage from and to the display device 200. In the case that the common voltage detected in the common voltage detector 43 is an alternating signal, the signal processor 35 applies the driving voltage to the auxiliary capacitor (Caux) while avoiding the rising edge or falling edge of the common voltage as shown in FIG. 12. The common voltage detector 43 may have a variety of circuit configurations.

In one embodiment such as that of FIG. 15, sensor signal lines 22 are placed between the sensor patterns 10 in the active region where the sensor patterns 10 are mounted, and are connected with the drive IC 30. If a touch screen panel is mounted separately on the display device, or is embedded in the display device, the sensor signal lines 22 should be formed of ITO or IZO to form transparent signal lines, at least in the visible region. According to the advantage of these wires, there is no need to have a separate area for wiring the signal lines since the entire signal lines are not collected and transferred to the drive IC 30 through a pathway. However, since the signal lines are placed between the sensor patterns 10, it is burdensome to widen a gap between the sensor patterns 10.

Meanwhile, in the wiring method of the sensor signal lines 22 of FIG. 15, since the length of the signal line connected to the sensor pattern 10 located at the uppermost end differs from the length of the signal line connected to the sensor pattern 10 located at the lowermost end, the wiring resistances of the signal lines vary for each sensor pattern 10. If a resistance value increases, a delay occurs when touch signals are detected. Accordingly, if the width of the sensor signal line 22 that is wired on the upper-more end is made to be wider than the width of the sensor signal line 22 that is wired on the lower-more end, and the width of the wire becomes narrower as it is closer to the drive IC 30, it is possible to match the wiring resistances of all the signal lines for all the sensor patterns 10. Thus, the signal processor 35 can perform detection of the touch signals more easily.

Figure 2:
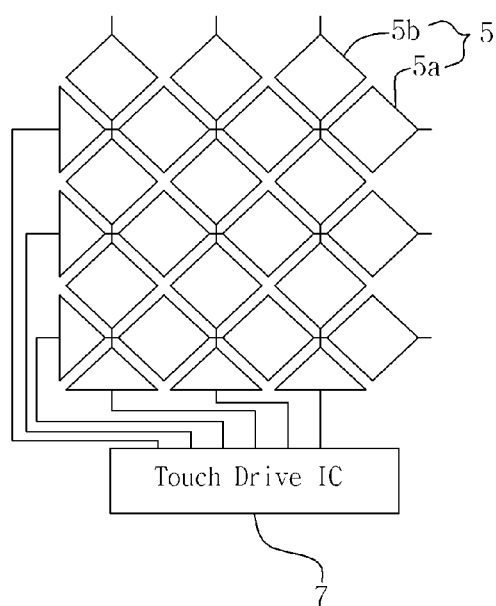
FIG. 2 is a plan view showing another example of a conventional capacitive touch screen panel.
Figure 3:
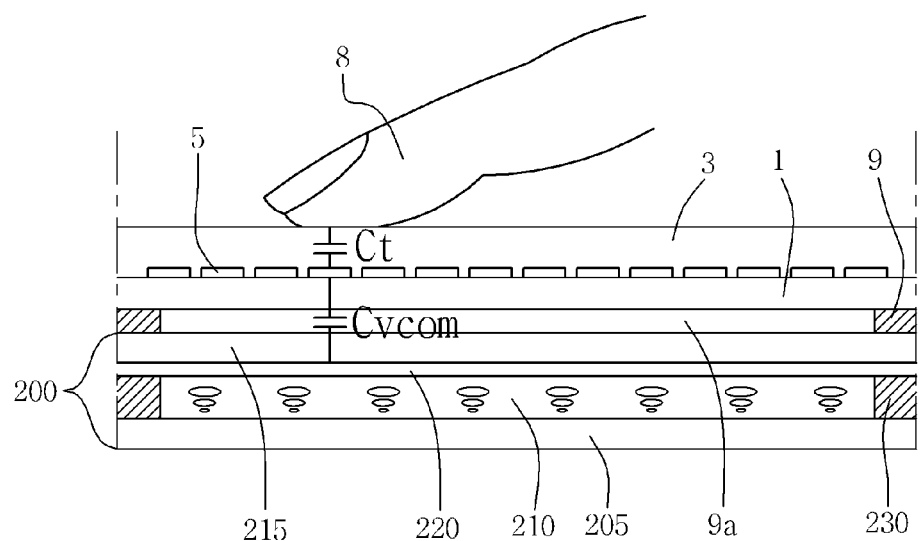
FIG. 3 is a cross-sectional view showing an example in which a touch screen panel of FIG. 2 is installed on top of a display device.
Figure 4:
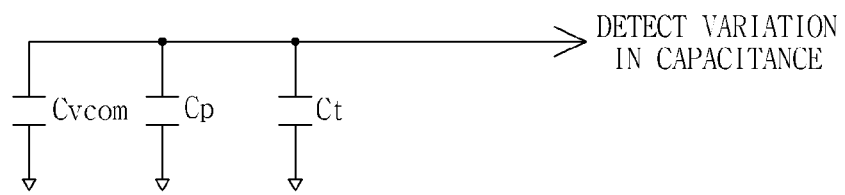
FIG. 4 is an equivalent circuit diagram showing that a touch capacitance is detected in FIG. 3.

On the other hand, in the conventional method such as that of FIG. 2, the linear sensor patterns are formed of a transparent material, but the signal lines that connect the linear sensor patterns with the touch drive IC should be formed of opaque metal such as silver or copper to lower the resistance value. As a result, there is a problem that a plurality of masks should be used, thereby increasing the processing cost and degrading the yield. However, referring to Equations 1 and 2 representing the touch detection using the voltage difference according to the present invention, resistance does not act as a variable. Therefore, resistance values of the sensor signal lines 22 can be set relatively high. As a result, ITO or IZO having high resistance may be used to form the sensor signal lines 22. Thus, in the same configuration as that of FIG. 15, the sensor patterns 10 and the sensor signal lines 22 can be configured with the same material as a transparent material such as ITO or IZO, which means that the sensor patterns 10 and the sensor signal lines 22 are prepared with a single mask, to thereby provide an effect of increasing the production cost and the yield.

FIG. 16 shows another embodiment of the touch screen panel. Referring to FIG. 16, the sensor patterns 10 and the sensor signal lines 22 are formed in the active region 90 of the substrate 50. The sensor signal lines 22 may be wired with metal in the active region 90, but preferably may be wired as the transparent signal lines 22a in the active region 90. The sensor signal lines 22 may be wired as the transparent signal lines 22a in the active region 90, and thus may be placed between the sensor patterns in the same manner as in the embodiment of FIG. 15, but the sensor signal lines 22 may be wired as the transparent signal lines 22a in the active region 90 and may be wired as metal signal lines 22b that are connected with the transparent signal lines 22a through connectors 59 in an invisible region 92, in the same manner as in the embodiment of FIG. 16. However, according to the drawback of this wiring method, the width of the invisible region 92 should be widened and thus it is difficult to slim the touch device.

The touch detection sensor 14 may be an analog to digital converter (ADC), a buffer or an amplifier that is mounted in the drive IC 30. However, as shown, if the differential amplifier 18a is used as the touch detection sensor 14, the touch signal from which noise is removed is amplified and processed, and thus it is easy to capture the touch signal. In FIG. 16, the differential amplifier 18a and the ADC 14a are not used together, but one of the two detects a touch input. If the differential amplifier 18a detects a touch input, the ADC 14a is connected with the output end of the differential amplifier 18a to thus convert an analog signal output from the differential amplifier 18a into a digital signal.

Referring to FIG. 16, a comparator 19 is further connected to the output end of the differential amplifier 18a (or the output end of a buffer connected to the point P although it is not shown in the drawing). The comparator 19 is used to automatically detect the rising edge and the falling edge of the common voltage of the display device 200 when the common voltage alternates. Since the input end of the differential amplifier 18a is in a Hi-z state, that is, in a high impedance state, at a state where the charging unit 12 has been turned off, the sensor pattern 10 is electrically isolated to be a floating state. In this case, if the voltage level fluctuates in the common electrode 220 of the display device 200, the electric potential of the sensor pattern 10 is changed. In other words, the electric potential of the point P alternates in synchronization with the alternating common voltage. The alternating voltage levels are formed high or low based on the charging voltage. If the voltage of the point P is directly connected to the comparator 19, and thus is compared with 5 V that is a comparison voltage (such as the charging voltage in the waveform of FIG. 13), height of the common voltage can be read out.

If a touch input occurs, the width of the voltage difference at the point P will be smaller. As shown, after the voltage level at the point P is amplified by the differential amplifier 18a and then compared with a reference voltage (Vref) in the comparator 19, height of the common voltage can be read out. Thus, the common voltage detector 43 can be constructed by using a simple circuit such as the comparator 19.

In the embodiment of FIG. 15 or 16, the sensor pattern 10 has a unique position coordinate. The unique position coordinate of each sensor pattern can be identified regardless of by sequentially scanning each sensor pattern or by scanning sensor patterns on a group basis, and thus it is possible to execute a multi-touch recognition of recognizing that multiple touches occur in multiple sensor patterns 10 according to the present invention.

Meanwhile, in the embodiments of FIG. 16, the charging unit 12 and the touch detection sensor 14 are separately provided for each unit cell of the sensor patterns 10, but are only the exemplary embodiment. For example, a plurality of sensor patterns 10 may be grouped and connected with a charging unit 12 and a touch detection sensor 14, through a multiplexer (MUX).

Figure 17:
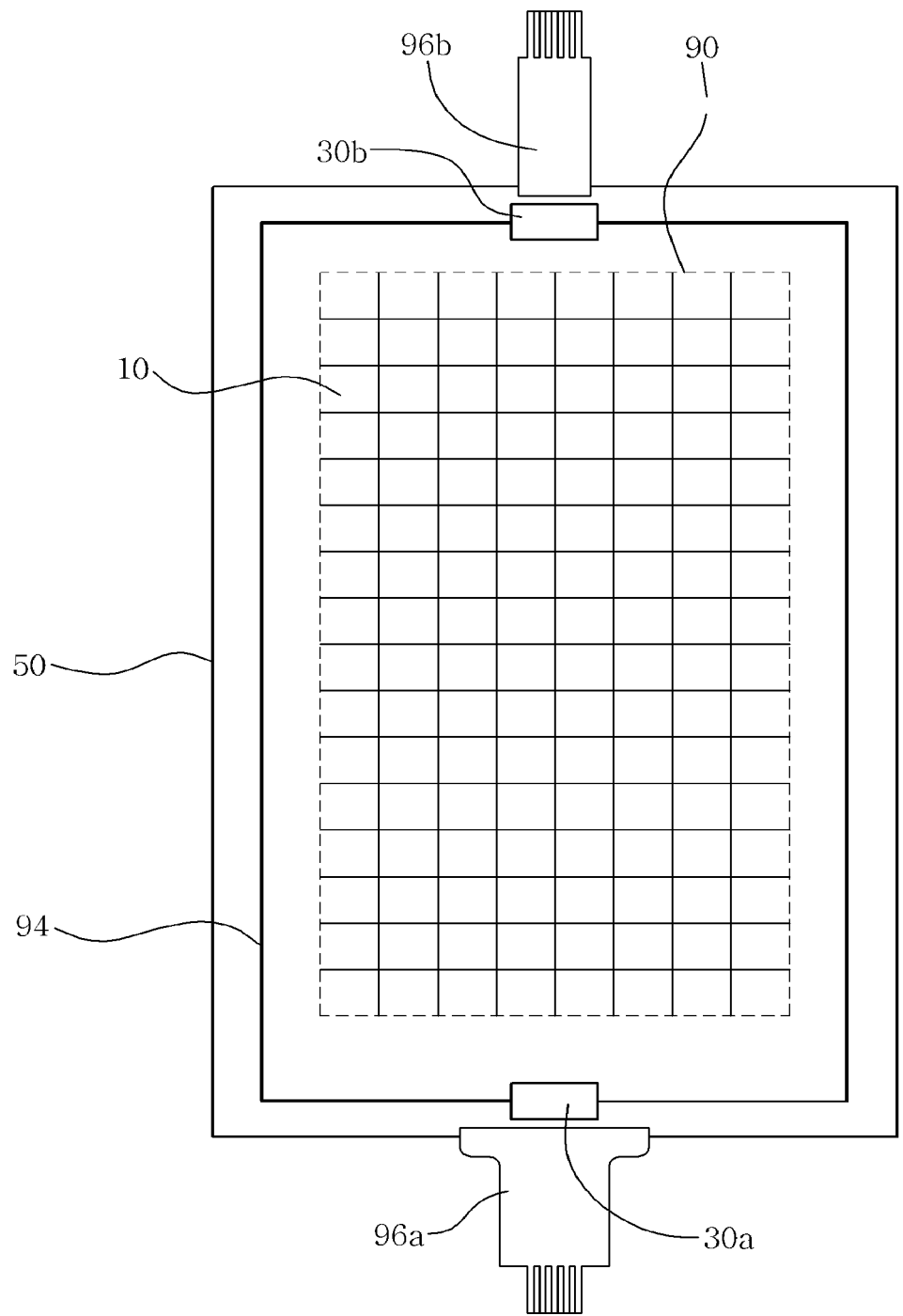
FIG. 17 is a plan view showing an example in which a plurality of drive integrated circuits (ICs) are provided.

FIG. 17 shows a way of increasing a touch resolution. Referring to FIG. 17, a plurality of drive ICs 30a and 30b may be mounted on a substrate 50. Preferably, when a plurality of drive ICs 30a and 30b are mounted, the drive ICs 30a and 30b are mounted on a glass substrate 50 in the form of a chip on glass (COG), as shown. The drive ICs 30a and 30b includes a master driver IC 30a that delivers touch signals externally, and a slave drive IC 30b that is connected to the master drive IC 30a via a communication channel 94 on the substrate 50.

A flexible printed circuit (FPC) 96a for sending and receiving signals externally is connected to the master drive IC 30a. Since the slave drive IC 30b communicates with the master drive IC 30a through the communication channel 94, a separate FPC does not need to be connected to the slave drive IC 30b. However, in order to be distinguished from power lines, a FPC 96b for power delivery may be connected to the slave drive IC 30b as shown.

In order to prevent conflicts between signals detected by the master drive IC 30a and signals detected by the slave drive IC 30b, the master drive IC 30a gives priority to both the signals detected by the master drive IC 30a and the slave drive IC 30b, or gives a scanning order, or uses a separate memory space, to thereby process touch signals. In addition, the master drive IC 30a and the slave drive IC 30b may refer to mutual signals on the touch detection boundary surface.

For example, in the case of the full resolution of 10×20 (width×length) of FIG. 17, it is assumed that each of the ICs is responsible for touch detection for an area of 10×10 (width×length). In this case, since the master drive IC 30a and the slave drive IC 30b do not know touch information of areas beyond their own areas at the tenth and eleventh contact points on the longitudinal cross-boundary surface, a detecting power at the longitudinal tenth and eleventh areas will be reduced. In other words, the touch detection linearity is lowered.

In order to solve these problems, a drive IC refers to information relative to another drive IC at an interface therebetween. For example, if the master drive IC 30a detects a touch for the first to tenth areas in the vertical direction, the master drive IC 30a refers to a signal of an area that is located at the longitudinal eleventh area and in which the slave drive IC 30b detects a touch signal, and thus detects touches of the longitudinal tenth sensor patterns 10. In addition, when the slave drive IC 30b detects touches of the longitudinal eleventh sensor patterns 10, the slave drive IC 30b refers to information of the longitudinal tenth sensor patterns 10 that are governed by the master drive IC 30a.

To do this, a memory unit is further provided, and thus the master drive IC 30a and the slave drive IC 30b receive a signal detected in the opposite IC via a communication line at the interface thereof and then write the received signal on the memory unit, so as to be used for operations in the signal processor 35.

Figure 18:
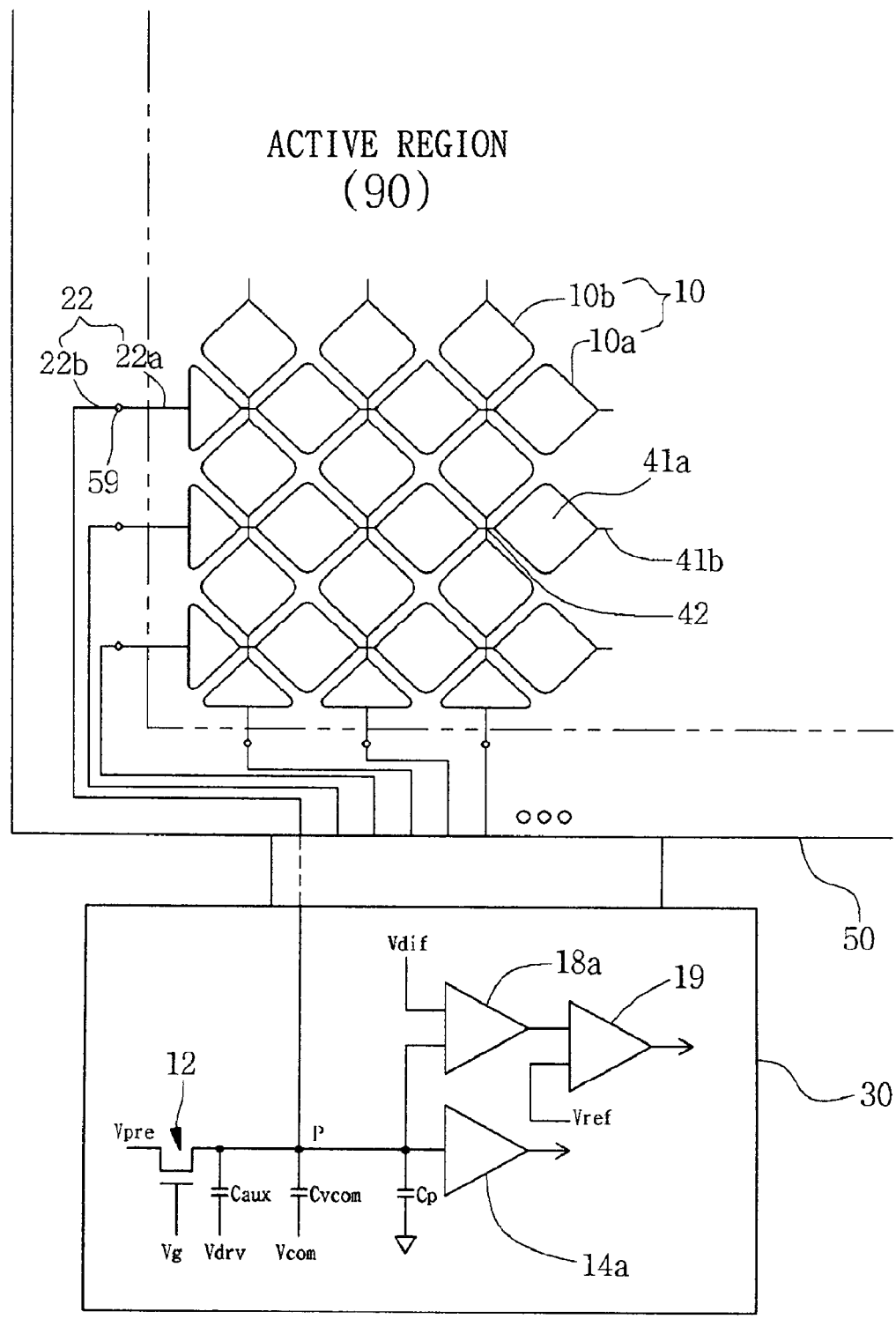
FIG. 18 is a schematic diagram showing a touch screen panel according to still another embodiment of the present invention.

FIG. 18 shows another embodiment of a touch screen panel. In the previous embodiments of the touch screen panel, the sensor patterns 10 are arranged in the form of a dot-matrix pattern, but in the embodiment of FIG. 18, the sensor patterns 10 are arranged in the form of a linear pattern. Referring to FIG. 18, x-axis linear sensor patterns 10a and y-axis linear sensor patterns 10b are crosswise arranged in the active region 90 of the substrate 50. Each of the linear sensor patterns 10a and 10b includes an opposite area portion 41a for forming a touch capacitance Ct with respect to a touch input instrument, and a connection portion 41b for connecting the opposite area portion 41a with another opposite area portion 41a. In addition, the x-axis linear sensor patterns 10a and y-axis linear sensor patterns 10b cross each other at the connection portions 41b, to thus form crossing portions 42.

The crossing portions 42 are intended to mutually isolate the linear sensor patterns 10a and 10b of the mutually different axes. For example, the connection portions 41b of the x-axis linear sensor patterns 10a are first formed, and then an insulating layer is formed on top of the connection portions 41b of the x-axis linear sensor patterns 10a, and then the connection portions 41b of the y-axis of the linear sensor patterns 10b are formed in the form of a bridge so as to pass over the insulating layer.

The big advantage of the embodiment of FIG. 18 is that the number of the signal lines 22 wired in the active region 90 or the invisible region 92 of the substrate 50 is greatly reduced. If the sizes of the sensor patterns 10 are designed to be small, the physical touch resolution may be increased compared to the preceding embodiments even though the number of the sensor signal lines 22 that are placed between the sensor patterns 10 in the invisible region 92 or the active region 90 of the substrate 50 is not designed to become large.

In the embodiment having a linear array of FIG. 18, the x-axis linear sensor patterns 10a and the y-axis linear sensor patterns 10b may detect whether or not touches occur on one of the x-axis and y-axis and then whether or not touches occur on the other of the x-axis and y-axis, or may detect whether or not touches occur on both of the x-axis and y-axis. At the time of detecting touches, a scanning method is used in order to sequentially scan the x-axis and y-axis. In addition, the touch detection may be performed after the entire x-axis is made to be in an active state, or after the entire y-axis is made to be in an active state. Even in the case of this configuration, a detection technique using a voltage difference is applied in the same manner as the above-described dot matrix method.

Meanwhile, in the embodiment having a linear array of FIG. 18, referring to the Equations 1 and 2 to detect the voltage difference, the resistance values of the linear patterns 10 and the sensor signal lines 22 are not included in the variables. Accordingly, the transparent material such as ITO or IZO having a relatively larger resistance value may be used for the linear patterns 10 and the sensor signal lines 22. As a result, it is possible to manufacture the linear patterns 10 and the sensor signal lines 22 with a single mask.

Figure 19:
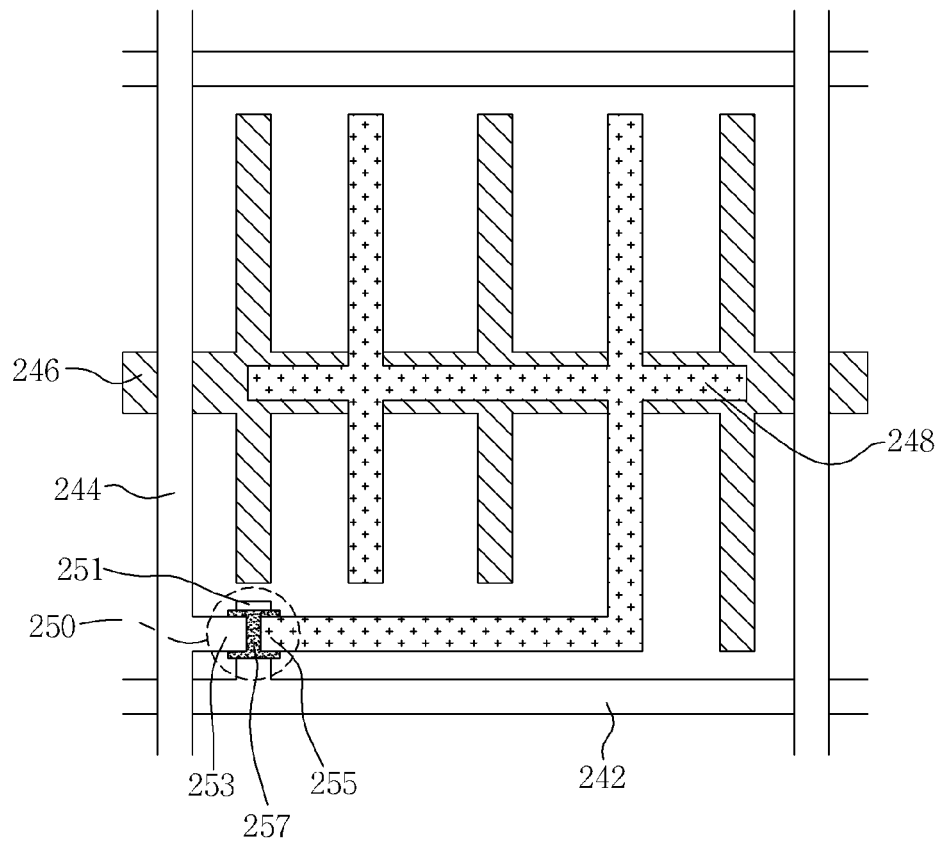
FIG. 19 is a plan view showing a configuration of a thin film transistor (TFT) substrate of a liquid crystal display (LCD) device.

On the other hand, FIG. 19 illustrates a configuration of a thin film transistor (TFT) substrate for a liquid crystal display (LCD), and particularly, shows the configuration of the TFT substrate of a transverse electric field mode. In contrast to the aforementioned embodiment, the common electrode 220 is formed only in part of the area of the panel in the LCD of the transverse electric field mode. Referring to FIG. 19, the LCD of the transverse electric field mode will be described below briefly.

As illustrated in FIG. 19, gate lines 242 and data lines 244 are arranged in the length and breadth on the upper surface of the TFT substrate, and areas that are sectionalized by the gate lines 242 and the data lines 244 form pixels. A TFT 250 for switching an image signal is mounted in a pixel. A gate electrode 251 of the TFT 250 is connected to a gate line 242 to receive a scanning signal, and a source electrode 253 and a drain electrode 255 thereof are connected to a data line 244 and a pixel electrode line 248, respectively. In addition, a semiconductor layer 257 of the TFT 250 forms a channel between the source electrode 253 and the drain electrode 255 in order to apply an image signal to a liquid crystal layer. As shown, a common electrode line 246 is formed in the pixel in parallel to the pixel electrode line 248.

In the LCD having such a configuration, if the TFT 250 is activated, and thus an image signal is applied to the pixel electrode line 248, a substantially parallel transverse electric field occurs between the common electrode line 246 and the pixel electrode line 248, and the liquid crystal molecules move on a plane.

However, as shown, the common electrode line 246 is formed in only a partial area. Thus, Cvcom that is formed between the sensor pattern 10 and the common electrode line 246 is formed smaller than in the previous embodiment. Since Cvcom is proportional to the opposite area between the sensor pattern 10 and the common electrode line 246, the opposite area is formed by an area formed by the common electrode line 246, even though the sensor pattern 10 covers the entire pixel shown in FIG. 18. If the common electrode 220 of the display device 200 in the embodiment of FIG. 18 is formed as shown in FIG. 19, Cvcom with respect to Ct will be very small in size. Thus, the size of the voltage difference due to occurrence or non-occurrence of a touch input becomes larger.

However, in the embodiment of FIG. 19, parasitic capacitances Cp due to the gate lines 242, the data lines 244, and the pixel electrode lines 248 may have values that are approximate to Cvcom or higher values than Cvcom. The parasitic capacitances Cp may serve as noise components for the touch signal detection. Thus, in the embodiment of FIG. 19, it is desirable that the drive IC 30 detects the touch by considering the timing when there are no changes in the signals in the gate lines 242 and the data lines 244 of the LCD.

Figure 20:
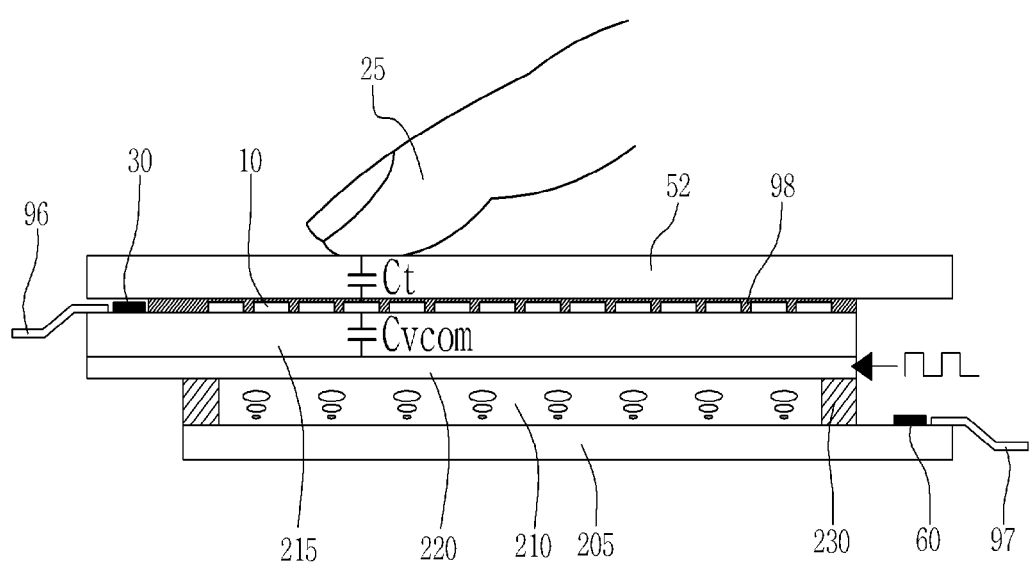
FIG. 20 is a cross-sectional view showing a display device having a built-in touch screen panel according to the present invention.
Figure 21:
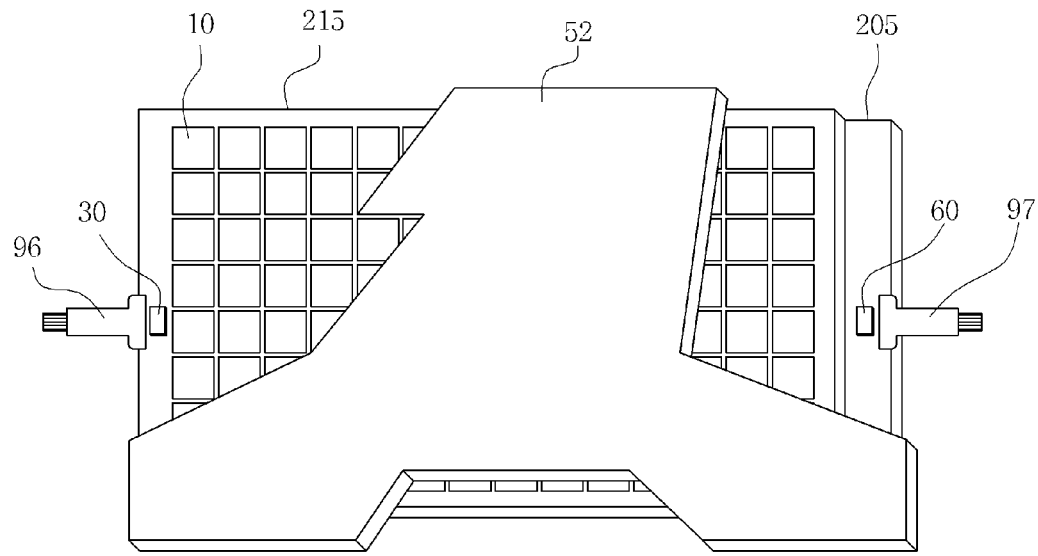
FIG. 21 is a disassembled perspective view illustrating a display device having a built-in touch screen panel according to the present invention.

FIGS. 20 and 21 are a cross-sectional view and an exploded perspective view of a display device with a built-in touch-screen panel, respectively. Referring to FIGS. 20 and 21, the touch screen panel and the display device with the built-in touch-screen panel according to the present invention will be described below.

As shown in FIG. 20, the color filter 215 of the display device 200 may be replaced with a touch-screen panel according to the present invention. In the same manner as in a conventional LCD, the common electrode 20 is formed on the lower surface of the color filter 215. As another example, in a transverse electric field mode such as that of FIG. 19, the common electrode 220 is formed on the upper surface of the TFT substrate 205. In the example of FIG. 19 or 20, as shown, the sensor patterns 10 are formed on the color filter 215. In addition, a protection panel 52 such as reinforced glass may be mounted on the upper surface of the sensor patterns 10, in order to protect the sensor patterns 10. In the embodiment of FIG. 20, the protective panel 52 is attached on the upper surface of the color filter 215 by means of a transparent adhesive material such as a UV-curable resin 98.

In this configuration, only the color filter 215 exists as a medium between the sensor patterns 10 and the common electrode 220. Thus, Cvcom becomes large, and Ct becomes relatively small. The growth of Cvcom means that the influence of Cp can be minimized as shown in the Equation 1. Thus, a touch signal can be obtained more stably by minimizing the influence of Cp due to the unknown factors.

In the illustrated example, a drive IC 60 for displaying images on a LCD is mounted in the form of a COG pattern on the TFT substrate 205. A drive IC 30 for controlling a touch signal is mounted in the form of a COG or COF pattern on the color filter 215. FPCs 96 and 97 are withdrawn from the drive ICs 30 and 60, respectively. Further, the touch drive IC 30 and the LCD drive IC 60 may be integrated into a single IC. In addition, the TFT substrate 205 and the color filter 215 are connected to the FPCs so as to transmit and receive signals externally.

Meanwhile, if the sensor patterns 10 and the sensor signal lines 22 according to the present invention may be manufactured by using a single mask, the yield is increased and the manufacturing time is reduced, to thus reduce manufacturing costs. Such a method of manufacturing the sensor patterns 10 and the sensor signal lines 22 with a single mask will follow with reference to FIG. 22.

Figure 22:
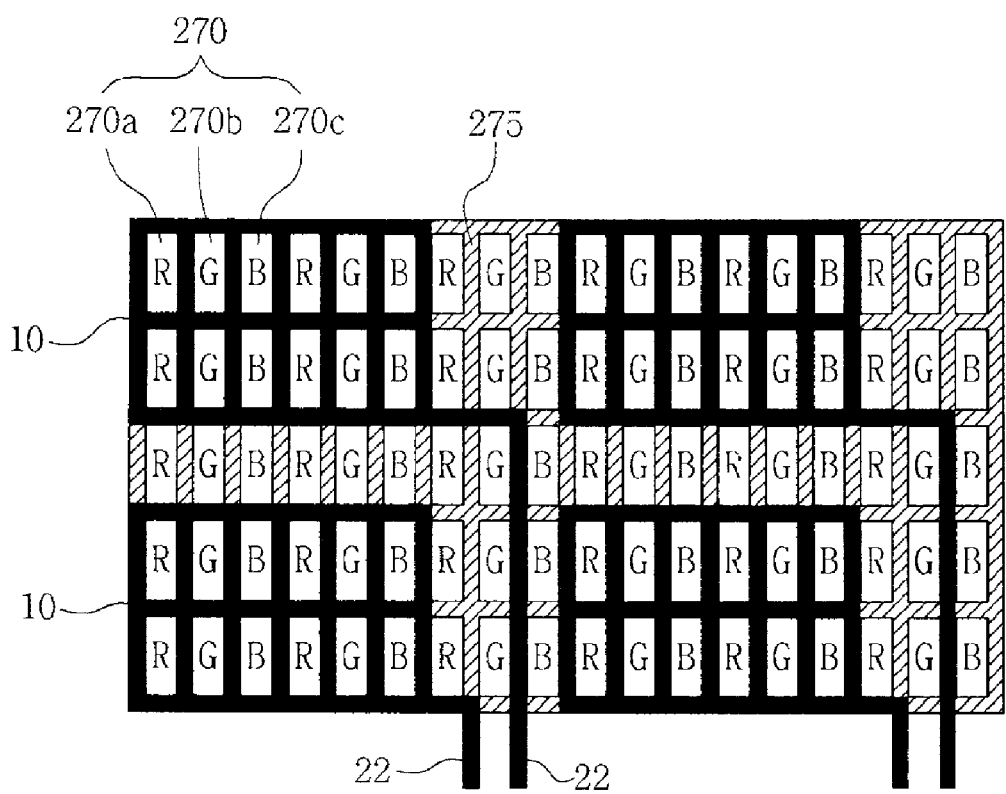
FIG. 22 is a cross-sectional view showing a configuration of sensor patterns according to still another embodiment of the present invention.

In the case of forming the sensor patterns 10 on the top surface of the color filter 215 as shown in FIG. 20 or 21, resins representing a sense of color exist in the form of Red, Green and Blue (R/G/B) on the other side of one surface of the color filter 215 on which the sensor patterns 10 are patterned, in which the Red, Green and Blue resins are defined as pixels, and a combination of three pixels 270a, 270b, and 270c of R/G/B is defined as a dot 270, as shown in FIG. 22.

FIG. 22 illustrates the color filter 215 consisting of six dots 270 in the horizontal direction and five dots 270 in the vertical direction. As shown in FIG. 22, the sensor patterns 10 may be located at a Black Matrix (BM) 275 that is a boundary portion of the respective pixels 270a, 270b, and 270c.

The BM 275 plays a role of hiding signal lines connected to the respective pixels 270a, 270b, and 270c of the LCD, or distinguishing senses of color of the pixels, and are usually placed in a width of several μm to several tens μm. The BM 275 consists of a material of a black color group that is not reflected and that is not permeable, and is located at the boundary surface of the resin at the lower side of the color filter. A share of the BM 275 in one pixel 270a, 270b, or 270c is usually around 20% to 50%. Thus, although the sensor patterns 10 are formed on the BM 275, a sufficient area of the sensor patterns can be secured.

Referring to FIG. 22, the sensor patterns 10 are located in the BM between the pixels and one of the sensor patterns 10 is formed to accommodate four dots 270. The sensor patterns 10 are all connected to each other in a grid structure, within the BM 275 around the pixels 270a, 270b, and 270c and the dots 270, and the sensor signal lines 22 are wired to the BM to be connected to the drive IC 30.

According to the advantages of this structure, the sensor patterns 10 and the sensor signal lines 22 may be disposed in the BM 275 that is in an invisible region, and the sensor patterns 10 and the sensor signal lines 22 may be formed of metal. Thus, the sensor patterns 10 and the sensor signal lines 22 may be formed with a single mask. Of course, the resistance values of the sensor signal lines 22 can be reduced and thus there is no need to greatly consider the wiring resistance. In addition, although the sensor patterns 10 and the sensor signal lines 22 are formed of metal, an aperture ratio of the pixel does not degrade. Since an electrical conductivity of metal is excellent, it is possible to transfer a more stable signal to the drive IC.

In the FIG. 22 embodiment, a plurality of pixels that do not contain the sensor patterns 10 are required between the sensor patterns 10 to wire the sensor signal lines 22. In addition, in the illustrated example, the boundary interfaces of the sensor patterns 10 in the vertical direction are separated by a single pixel, but may be separated by a plurality of pixels.

In the embodiment of FIG. 22, the sensor patterns 10 have been described with respect to the case that the sensor patterns 10 are mounted on the upper surface of the color filter, that is, on the outside of the color filter, but may exist in the inside of the color filter, that is, between color resins R/G/B and the inside of the color filter. When the sensor patterns are located on the upper side of the color filter, the manufacturing process of the color filter takes place in two locations of the inside and outside of the glass, but when the sensor patterns are located at the inside of the color filter, the manufacturing process is executed only in the inside of the glass, to thereby simplify the manufacturing process and increase the yield.

In the case that a non-transmissive material such as metal is used, non-reflective metal is used, or non-reflective chrome oxide or silver oxide or an inorganic material or an organic material of a black color group may be coated on the top surface of metal. The example of using metal has been described in this embodiment, but materials that are used to form the sensor patterns and the signal lines are not limited to non-transmissive materials such as metal, but materials having conductivity such as transparent conductive materials may be also applied.

In such an embodiment, the share of the BM is several tens %, and thus the area of the sensor patterns 10 that are mounted on the BM is several tens % of the area of the pixels. In addition, since the capacitance formed in the Equation 4 becomes several tens %, touch detection is not obstructed by adjusting these absolute areas as desired.

According to another advantage of the FIG. 22 embodiment, since no substances exist in the transmissive area of pixels, transmittance of pixels rises up when compared to other existing touch screens. In addition, in the case of the touch screen forming the sensor patterns made of a conventional transparent conductive material, index matching is executed in order to prevent visual identification of the transparent conductive material. The FIG. 22 embodiment has the advantage of removing such an index matching process.

In the embodiment of FIG. 22, the case where dots are 6×5 (width×length) has been described, but the present invention is not limited thereto. That is, dots of several tens to several hundreds, or the number exceeding several hundreds may be located on the lower side of a single sensor pattern 10. Also, in this example, the case where dots are separated through the color filter has been described, but the technical spirit of the present embodiments may be applied to all cases having separators that separate pixels from each other, such as an example with no color filter but with separators separating between pixels by bulkheads like a plasma display panel (PDP).

However, the present invention is not limited to the above embodiments, and it is possible for one who has an ordinary skill in the art to make various substitutions, modifications and variations without departing off the spirit of the invention defined by the claims.

| [Description of reference numerals] | |
| --- | --- |
| 10: sensor patterns | 10a: x-axis linear sensor patterns |
| 10b: y-axis linear sensor patterns | 12: charging unit |
| 14: touch detection sensor | 14a: ADC |
| 18: amplifier | 18a: differential amplifier |
| 19: comparator | 22: sensor signal lines |
| 22a: transparent signal lines | 22b: metal signal lines |
| 25: finger | 28: memory unit |
| 30: drive IC | 30a: master drive IC |
| 30b: slave drive IC | 31: driver |
| 33: timing controller | 35: signal processor |
| 37: alternating voltage generator | 40: CPU |
| 41a: opposite areas | 41b: connectors |
| 42: crossing portions | 43: common voltage detector |
| 45: common voltage information receiver | 47: selector |
| 50: substrate | 52: protection panel |
| 57: adhesive material | 58: air gap |
| 59: connectors | 60: drive ICs |
| 90: active region | 92: invisible region |
| 94: communication channel | 96: FPC |
| 97: FPC | 98: UV-curing resin |
| 200: display device | 205: TFT substrate |
| 210: liquid crystal layer | 215: color filter |
| 220: common electrode | 230: sealants |
| 242: gate lines | 244: data lines |
| 246: common electrode lines | 248: pixel electrode lines |
| 250: TFT | 251: gate electrode |
| 253: source electrode | 255: drain electrode |
| 257: semiconductor layer | 270: dots |
| 275: BM (Black Matrix) | |

The invention claimed is:

1. A capacitive touch screen panel of a display device for detecting occurrence of a touch capacitance, the capacitive touch screen panel comprising:
   a substrate;
   a plurality of sensor patterns formed in an interface portion, the interface portion separating pixels of the display device from each other and generating one or more touch signals when a finger or a touch input instrument approaches the plurality of sensor patterns;
   an auxiliary capacitor having one side that is connected to the sensor patterns and the other side to which a driving voltage for detection of a touch input is applied;
   a touch detection sensor that is connected to the sensor patterns, and that detects the one or more touch signals by detecting a voltage difference between a magnitude of a voltage generated in the sensor patterns by a driving voltage applied to the auxiliary capacitor when the touch capacitance is added at the time of occurrence of a touch input and a magnitude of a voltage generated by a driving voltage applied to the auxiliary capacitor in the sensor patterns at the time of non-occurrence of a touch input; and
   a drive integrated circuit (IC) that controls a charging unit to supply a pre-charge signal to the touch capacitance and computes touch coordinates from an output of the touch detection sensor,
   wherein the driving voltage that is applied to the other side of the auxiliary capacitor is an alternating voltage that alternates at a predetermined frequency.

2. The capacitive touch screen panel of claim 1, wherein the display device includes red, green, and blue (RGB) resins, and
   wherein the interface portion separating the pixels from each other is configured to separate a RED pixel, a GREEN pixel, and a BLUE pixel of the RGB resins from each other.

3. The capacitive touch screen panel of claim 1, wherein the display device includes red, green, and blue (RGB) pixels, and
   wherein the interface portion separating the pixels from each other is configured to separate the red pixel, the green pixel, and the blue pixel of the RGB pixels from each other.

4. The capacitive touch screen panel of claim 2, wherein the sensor patterns each have a plane lattice shape formed on the interface portion separating the pixels from each other.

5. The capacitive touch screen panel of claim 4, wherein the plane lattice shape is a square lattice shape.

6. The capacitive touch screen panel of claim 5, wherein the plurality of sensor patterns each having the square lattice shape are arranged in a matrix form.

7. The capacitive touch screen panel of claim 1, wherein the touch signals are generated using self capacitance of the sensor patterns.

8. The capacitive touch screen panel of claim 6, further comprising a plurality of sensor signal lines connected to the sensor patterns and transmitting the touch signals to the drive IC,
   wherein the sensor signal lines are formed on the interface portion separating the pixels from each other.

9. The capacitive touch screen panel of claim 8, wherein the sensor patterns and the sensor signal lines are formed of a metal.

10. The capacitive touch screen panel of claim 8, wherein the sensor patterns and the sensor signal lines are formed of a transparent conductive material.

11. The capacitive touch screen panel of claim 8, wherein the sensor patterns and the sensor signal lines are formed using a single mask.

12. The capacitive touch screen panel of claim 8, wherein the sensor signal lines are formed on the interface portion separating the pixels from each other between the sensor patterns.

13. The capacitive touch screen panel of claim 8, wherein a pair of sensor patterns disposed in neighboring columns of the matrix form are separated from each other by at least one pair of the RGB resins.

14. The capacitive touch screen panel of claim 3, wherein the plurality of sensor patterns are arranged in a matrix form,
   wherein a pair of sensor patterns disposed in neighboring columns of the matrix form are separated from each other by at least one pair of the RGB pixels, and
   wherein sensor signal lines connected to the sensor patterns are formed on the interface portion separating the pixels from each other.

15. The capacitive touch screen panel of claim 2, wherein a pair of sensor patterns disposed in neighboring rows of the matrix form are separated from each other by at least one of the RGB resins.

16. The capacitive touch screen panel of claim 3, wherein the plurality of sensor patterns are arranged in a matrix form, and
   wherein a pair of sensor patterns disposed on neighboring rows arranged in the matrix form are separated from each other by at least one of the RGB pixels.

17. The capacitive touch screen panel of claim 8, wherein a size of the plane lattice shape forming the sensor patterns varies depending on a distance from the touch drive IC.

18. The capacitive touch screen panel of claim 2, further comprising:
   a color filter,
   wherein the plurality of sensor patterns are formed on an upper surface of the color filter, and wherein the RGB resins are formed on a lower surface of the color filter.

19. The capacitive touch screen panel of claim 2, further comprising:
   a color filter,
   wherein the RGB resins are formed on a lower surface of the color filter, and
   wherein the plurality of sensor patterns are formed between the color filter and the RGB resins.

* * * * *